(12) United States Patent
Moriya et al.

(10) Patent No.: US 7,092,178 B2
(45) Date of Patent: Aug. 15, 2006

(54) MAGNETIC RECORDING METHOD, APPARATUS THEREFOR, AND DEVICE FOR DETERMINING COERCIVE FORCE OF MAGNETIC RECORDING MEDIUM

(75) Inventors: Seiji Moriya, Kyoto (JP); Masahiro Yoshii, Kyoto (JP); Akihiro Tadamasa, Kyoto (JP); Takeshi Horinouchi, Kyoto (JP); Gaku Sezaki, Kyoto (JP)

(73) Assignee: Omron Corporation, Kyoto (JP)

( * ) Notice: Subject to any disclaimer, the term of this patent is extended or adjusted under 35 U.S.C. 154(b) by 12 days.

(21) Appl. No.: 10/649,621

(22) Filed: Aug. 28, 2003

(65) Prior Publication Data

US 2004/0084528 A1  May 6, 2004

(30) Foreign Application Priority Data

Aug. 28, 2002 (JP) .............................. 2002-248510
Feb. 12, 2003 (JP) .............................. 2003-033694

(51) Int. Cl.
*G11B 27/36* (2006.01)
*G11B 25/04* (2006.01)

(52) U.S. Cl. ........................................... 360/31; 360/2
(58) Field of Classification Search .................... None
See application file for complete search history.

(56) References Cited

U.S. PATENT DOCUMENTS 6,141,161 A * 10/2000 Sato et al. ...................... 360/2
6,637,653 B1 * 10/2003 Takita et al. ................. 235/449

FOREIGN PATENT DOCUMENTS

| EP | 0 425 064 | 5/1991 |
|---|---|---|
| EP | 0 666 559 | 8/1995 |
| EP | 0 903 682 | 3/1999 |
| EP | 0903682 A2 * | 3/1999 |
| EP | 1 152 367 | 11/2001 |
| JP | 58-185008 | 10/1983 |
| JP | 11-73606 | 3/1999 |
| JP | 11-96506 | 4/1999 |
| JP | 11-328604 | 11/1999 |
| JP | 2000-155816 | 6/2000 |
| JP | 2000 195004 | 11/2000 |
| JP | 2001-118206 | 4/2001 |
| JP | 2001-148101 | 5/2001 |

OTHER PUBLICATIONS

State Intellectual Property Office, PRC, First Office Action, May 13, 2005.

* cited by examiner

*Primary Examiner*—Wayne Young
*Assistant Examiner*—Daniell L. Negrón
(74) *Attorney, Agent, or Firm*—Dickstein Shapiro Morin & Oshinsky LLP

(57) ABSTRACT

A method and apparatus are disclosed for determining an appropriate write current for a magnetic recording medium and to write magnetic information on the magnetic recording medium at the appropriate write current thus determined. When a current value suited to writing on a magnetic recording medium is to be found, a coercive force of the magnetic recording medium is found from a voltage at which magnetic information written on the magnetic recording medium is read, and a traveling quantity of the magnetic recording medium, and a current value corresponding to the coercive force, are found.

10 Claims, 19 Drawing Sheets

MAGNETIC RECORDING METHOD, APPARATUS THEREFOR, AND DEVICE FOR DETERMINING COERCIVE FORCE OF MAGNETIC RECORDING MEDIUM

BACKGROUND OF THE INVENTION

1. Field of the Invention

This invention relates to a magnetic recording method, in which magnetic information is recorded on a magnetic recording medium, such as a magnetic card, a form with magnetic stripes, or a magnetic ticket, at an appropriate current value, an apparatus therefor, and a device for determining a coercive force of a magnetic recording medium.

2. Description of Related Art

Ordinarily, magnetic cards include ones of two kinds with magnetic stripes being of different kinds. The one is a low coercive force magnetic card, on which magnetic information is recorded by means of a magnetic head with a small write current. The other is a high coercive force magnetic card, on which magnetic information is recorded by means of a magnetic head with a large write current.

In some cases, magnetic information cannot be written when a magnetic head writes the magnetic information on a low coercive force magnetic card at a large write current. Therefore, when the magnetic head reads the magnetic information, there can be generated a fact that it is not possible to detect an appropriate read voltage and realize the written information.

There is caused the same problem when a magnetic head writes magnetic information on a high coercive force magnetic card at a small write current.

Hereupon, the following techniques for determining a high coercive force magnetic card or a low coercive force magnetic card are present.

(1) While a head is moved relatively, writing is performed at a predetermined flux variation per predetermined length of magnetic stripes as a write current is increased within a preset range. The written magnetic stripes are read by a readout head. A comparison between a voltage value and a current value from the readout head is made to select a current value at that time in the case where the voltage value is in an allowable range. In the case where the voltage value is outside the allowable range, a range previously selected is changed at the time of writing and a process in which writing is again performed on the magnetic stripes is repeated, the written magnetic stripes are read, and a write current value is determined. Thereby, it is possible to determine a coercive force of magnetic stripes to write magnetic information on the magnetic stripes at an appropriate current value (see Japanese Patent document JP-A-2001-148101).

(2) There is proposed a magnetic information recording apparatus for determining a coercive force of a magnetic recording medium and performing recording while changing an intensity of magnetism applied on the magnetic recording medium in accordance with results of such determination to correspond to the coercive force of the magnetic recording medium. Magnetic recording media used for recording information include two kinds of ordinary tickets and season tickets. Information indicative of whether these tickets are high coercive force magnetic cards or low coercive force magnetic cards is written on these tickets. A readout head reads the information to determine whether a received ticket is a high coercive force magnetic card or a low coercive force magnetic card. Based on the results, an exciting current is set to a value suited to a coercive force of the ticket to perform magnetic recording (see Japanese Patent document JP-B-4-38045).

Also, the following is described as another measure. A small ordinary ticket is a high coercive force recording medium. A large season ticket is a low coercive force recording medium. Whether a ticket conveyed is an ordinary ticket or a season ticket is determined on the basis of a size of the ticket. In the case where a concerned ticket is a small one as results of the determination, information is written on the ticket at a high coercive force. Meanwhile, in the case where a concerned ticket is a large one as results of the determination, information is written on the ticket at a low coercive force. Thereby, magnetic recording is performed at an intensity of magnetism corresponding to a large or small coercive force of the ticket.

(3) A magnetic card reader reads and determines a coercive force of a magnetic card used. In this case, determination means for determining a coercive force of data tracks for recording of magnetic information is provided in the magnetic card reader, in which magnetic information of a magnetic card inserted into a card insertion port is reproduced or recorded by a magnetic head. And after a test data is recorded on data tracks of a magnetic card taken in, at a current corresponding to a low coercive force magnetic card, it is reproduced and the card is determined to be a low coercive force card in the case where the reproduced data corresponds to the test data (see Japanese Patent document JP-A-11-96506).

(4) A magnetic card reader reads and determines a coercive force of a magnetic card used. In this case, the magnetic card reader includes a plurality of magnetic heads provided corresponding to a plurality of tracks, which are formed on a magnetic card inserted into a card insertion port, to reproduce or record magnetic information on the plurality of tracks, the plurality of magnetic heads, respectively, serving to record or erase a data at a current of different predetermined values, and a coercive force determining unit for determining three or more kinds of coercive forces of data tracks through reproduction of recording and erasing results. For example, reproduction is performed after erasing is performed on a first track at a current of a first value, reproduction is performed after erasing is performed on a second track at a current of a second value, and a coercive force of a magnetic card is determined on the basis of the relationship between output levels of results of such reproduction and the first and second values (see Japanese Patent document JP-A-11-328604).

(5) There is proposed a method of determining a coercive force of a magnetic card used. In this case, the method, in which a magnetic head reproduces or records magnetic information formed on a low coercive force magnetic card or a high coercive force magnetic card inserted from a card insertion port, includes erasing a data of the inserted card at a current capable of erasing only a data of a low coercive force magnetic card, thereafter reproducing the data of the card, and determining the inserted card to be a low coercive force magnetic card in the case where the data has been destroyed. The destroyed state of the data is determined by the number of times of magnetization reversal of the reproduced data, or by non-recognition of a specific data (STX cord) recorded on a predetermined card (see Japanese Patent document JP-A-2000-155816).

(6) An operation of determining a magnetism coercive force can be omitted, a service life of an apparatus is extended, and the risk of data destruction due to wrong determination is avoided. Even when a magnetic card actually inserted is either of a high coercive force magnetic card and a low coercive force magnetic card, an operation of recording on the magnetic card is performed by performing again an operation of recording by the use of a small write current after an operation of recording by the use of a large write current so that predetermined magnetic information can be favorably written without determining whether a concerned magnetic card is either of the cards (see Japanese Patent document JP-A-2001-118206).

However, Japanese Patent document JP-A-2001-148101 involves a problem that a processing of determination takes much time since a magnetic card must be conveyed several times in order to determine an appropriate write current.

With the remaining Japanese Patent documents discussed above, it is possible to determine whether a kind of a magnetic card corresponds to a high coercive force or a low coercive force. A coercive force of a low coercive force magnetic card disperses in a particular, allowable region. However, a coercive force of a high coercive force magnetic card disperses in an unallowable region, in many cases. Therefore, an appropriate write current is in many cases different every high coercive force magnetic card.

Further, even when an appropriate write current at which writing is performed on respective magnetic cards is determined, whether a coercive force of a magnetic card is high or low, a coercive force, which is varied, cannot be measured.

Therefore, it is desired that appropriate write currents suited to respective magnetic cards be found. For example, it is conceivable that an appropriate write current suited to a coercive force of a magnetic card be found by writing magnetic information for determination of a coercive force on the magnetic card and reading the magnetic information thus written.

However, in this case, even when abnormality is involved in that magnetic information for determination of a coercive force, which is written on the magnetic card, determination of magnetism is done as it is, so that a normal coercive force is not obtained.

BRIEF SUMMARY OF THE INVENTION

According to a preferred embodiment, the invention provides a magnetic recording method, wherein during movement of a magnetic recording medium relative to a write head and a readout head in one direction, the write head performs preliminary writing on the magnetic recording medium at a plurality of different current values, the readout head reads the preliminarily written information, an appropriate value of a write current suited to the magnetic recording medium is found on the basis of results of the reading, and the write head performs regular writing on the magnetic recording medium at the appropriate value thus found.

Here, a magnetic recording medium is one comprising a magnetic recording surface, such as magnetic stripes, to permit recording or reproduction of magnetic information.

The write head generates a magnetic field when a current is applied on the head, and writes magnetic information on a magnetic recording surface of a magnetic recording medium contacting the write head. When the write head is moved relative to the magnetic recording medium in one direction, it sequentially writes magnetic information on the magnetic recording surface of the magnetic recording medium. For example, writing is performed while the write head is moved. Alternatively, writing is performed while the magnetic recording medium is moved, and thus writing is performed while the write head and the magnetic recording medium are relatively moved in one direction.

When the readout head is moved on the magnetic recording surface of the magnetic recording medium, a magnetic field is generated to generate a voltage on the readout head, and the readout head reads magnetic information from the magnetic recording surface of the magnetic recording medium upon a change in the voltage. When the write head is moved relative to the magnetic recording medium in one direction, magnetic information is sequentially read from the magnetic recording surface of the magnetic recording medium. For example, reading is performed while the readout head is moved. Alternatively, reading is performed while the magnetic recording medium is moved, and thus reading is performed while the readout head and the magnetic recording medium are relatively moved in one direction.

The write head and readout head may be provided side by side on the same conveyance path of a magnetic recording medium in a direction of conveyance, or a single head having both functions capable of reading and writing may also serve as both heads.

The term "preliminary writing" means that magnetic information is written on a magnetic recording surface of the magnetic recording medium while a write current of a write head is changed in current value.

The term "regular writing" means that magnetic information is written at an appropriate value of a write current suited to the magnetic recording medium found on the basis of results of the preliminary writing.

The appropriate value of a write current is one determined to be suited for every different coercive force to be applied on a write head.

Every magnetic recording medium has a different coercive force. Therefore, the appropriate value of the write current is determined to be suited to each coercive force of the magnetic recording medium.

According to the magnetic recording method, an appropriate value required for regular writing is found from results of preliminary writing on a magnetic recording medium and regular writing is performed. According to a preferred embodiment, at this time, respective operations of preliminary writing and regular writing can be performed while a magnetic recording medium is moved relative to a write head in one direction.

According to another preferred embodiment, a further invention provides a magnetic recording apparatus comprising a write head for writing magnetic information on a magnetic recording medium, a readout head for reading magnetic information from the magnetic recording medium, and control means for controlling the heads, the control means comprising a preliminary writing processing, in which during movement of the magnetic recording medium relative to the write head and the readout head in one direction, the write head performs preliminary writing on the magnetic recording medium at a plurality of different current values, a preliminary reading process, in which the readout head reads results of the preliminary writing, an appropriate value acquisition process, in which an appropriate value of a write current for the magnetic recording medium is acquired on the basis of results of the preliminary writing, and a regular writing process, in which the write head performs regular writing on the magnetic recording medium on the basis of the appropriate value.

Here, a magnetic recording apparatus can be constituted by, for example, a card reader performing a magnetic process for reading magnetic information from a magnetic recording medium and writing magnetic information on a magnetic recording medium.

In the appropriate value acquisition process, an appropriate value of a write current is calculated from an output value read by the readout head. For example, a peak value of amplitude of a waveform data read by the readout head, or a value close to the peak value, is detected, and an appropriate value of a write current is acquired from the detected value.

According to another preferred embodiment, a preliminary writing process is completed in a motion, in which a magnetic recording medium passes a write head once in one direction. Also, a preliminary reading process is completed in a motion, in which a magnetic recording medium passes a readout head once.

Also, by providing a readout head and a write head side by side on the same conveyance path of a magnetic recording medium, a writing process and a reading process can be performed only when the magnetic recording medium is conveyed in one direction. Therefore, in the preferred embodiment, it is possible to find a coercive force of a magnetic recording medium upon conveyances.

According to another preferred embodiment, a still further invention provides a device for determining a coercive force of a magnetic recording medium, including conveyance means for conveying the magnetic recording medium, traveling quantity detection means for detecting a traveling quantity of the magnetic recording medium, a write head for writing magnetic information on the magnetic recording medium at a plurality of different current values while the conveyance means conveys the magnetic recording medium in one direction, a readout head for reading magnetic information on the magnetic recording medium conveyed by the conveyance means after the write head writes magnetic information on the magnetic recording medium, and determination means for determining a coercive force of the magnetic recording medium on the basis of a voltage read by the readout head and a traveling quantity of the magnetic recording medium at the time of reading.

The conveyance means includes a conveyance path of a magnetic recording medium constituted by arranging conveyance members, such as conveyance rollers which receive torque from, for example, a motor to rotate, or a conveyance belt, in a direction of conveyance. The conveyance means move the magnetic recording medium in a take-in direction or a return direction.

Further, a write head and a readout head are arranged about the conveyance path. Magnetic information is written on a magnetic recording medium which passes the heads. Also, magnetic information of a magnetic recording medium passing the heads is read.

The traveling quantity corresponds to a distance of conveyance and time of conveyance when the conveyance means is driven by a motor or the like to convey a magnetic recording medium.

The traveling quantity detection means detects the traveling quantity when a magnetic recording medium is conveyed. For example, the number of revolutions of a motor serving as a drive source of the conveyance means and a traveling quantity of a magnetic recording medium are in proportional connection. Therefore, it suffices to detect the number of revolutions of a motor, or to detect a distance of movement of a magnetic recording medium. Further, when a magnetic recording medium is conveyed at a constant speed, a distance of movement of a magnetic recording medium and duration taken in movement are in proportional connection. Therefore, it suffices to detect a distance of movement of a magnetic recording medium, or duration in movement.

When reading magnetic information of a magnetic recording medium written at a plurality of different current values, the determination means determines a coercive force of the magnetic recording medium from a traveling quantity of the magnetic recording medium and a change in voltage in response to the traveling quantity and read by the readout head.

According to another preferred embodiment, magnetic information written on a magnetic recording medium and read from the magnetic recording medium can be measured from a voltage at which magnetic information written on the magnetic recording medium is read, and a traveling quantity of the magnetic recording medium is determined. Accordingly, the magnetic recording positions can be measured whereby it is possible to find a coercive force of the magnetic recording medium. In particular, during conveyance in one direction in the case where a magnetic recording medium is not conveyed separately each time a current is varied but conveyed, a write head can write wide magnetic information on the magnetic recording medium at a plurality of different current values such as a large current, small current, etc. Therefore, the number of times of conveyance at the time of writing of magnetic information suffices to be one at the time of preliminary writing.

According another preferred embodiment, a further invention provides a device for determining a coercive force of a magnetic recording medium, including conveyance means for conveying the magnetic recording medium, traveling quantity detection means for detecting a traveling quantity of the magnetic recording medium, and a write head for writing magnetic information on the magnetic recording medium conveyed by the conveyance means. The device also includes a write current waveform storage means for storing a waveform of a write current value of the write head varying relative to a traveling quantity, write current changing means for changing a write current of the write head in accordance with a write current value stored in the write current waveform storage means and a readout head for reading magnetic information on the magnetic recording medium conveyed by the conveyance means after the write head writes magnetic information on the magnetic recording medium. Also included are determination means for determining a coercive force of the magnetic recording medium on the basis of a voltage read by the readout head, a traveling quantity of the magnetic recording medium at the time of reading, and time-variation of a write current value stored in the write current waveform storage means. The write current changing means repeatedly changes the same waveform a plurality of times.

The waveform change corresponding to a conveyance distance is a waveform representative of a current value at the time of writing relative to the passage of the conveyance distance. In addition to this waveform, the waveform may be formed by a function representative of a current value at the time of writing relative to the passage of time. Also, a traveling quantity time may be used in place of the conveyance distance.

According to another preferred embodiment, in the case of writing with a write head, information of a plurality of waveforms is acquired by changing a write current and repeating the same waveform plural times. Therefore, a comparison among the plurality of waveforms as acquired makes it possible to determine suitability of respective waveforms since the same waveform is written. For example, when two among three waveforms are the same and one waveform is different from the remainder, the one waveform is recognized as being an unfit, abnormal one. As a result, a coercive force can be determined from a plurality of waveforms except an abnormal one.

Also, according to another preferred embodiment, a further invention has a feature in that during repetition of the same waveform in the course of conveyance of a magnetic recording medium, the write head does not perform writing by time for separation of a plurality of the same waveforms.

In place of the distance, conveyance time may be used to separate a plurality of waveforms.

In this case, since unwritten portions for separation of waveforms are present between the waveforms, it is possible to separate respective waveforms having been written repeatedly.

Also, according to another preferred embodiment, a further invention has a feature in that during repetition of the same waveform in the course of conveyance of a magnetic recording medium, the write current changing means maintains a write current of the write head at a magnitude of a further waveform, which constitutes a reference position, for a duration, during which the waveform constituting the reference position is formed.

In this case, a separate, different waveform is formed between two waveforms. This serves as a mark, and the provision of such mark makes it possible to separate a plurality of waveforms. Also, since such mark can be set in a reference position for positioning of waveforms, a traveling quantity of a magnetic recording medium is found.

According to another preferred embodiment, a further invention has a feature in that in the course of conveyance of a magnetic recording medium, the write current changing means causes a write current of the write head to be alternately output and stopped repeatedly at predetermined intervals.

In this case, writing stoppage portions make marks without waveforms, and serve as reference positions for measurement of positions of waveforms. In particular, since waveforms and marks can be provided alternately in short time spacings, a distinction can be made even if a certain waveform is lost. Accordingly, it is possible to specify a position for conveyance of a magnetic recording medium, corresponding to a write position of the magnetic recording medium.

According to another preferred embodiment, a further invention has a feature in that in the course of conveyance of a magnetic recording medium, the write current changing means stepwise increases a write current such that each time the write current is increased, a duration, during which the write current is maintained, is varied.

In this case, a duration for maintenance is different every write current stepwise increase. Therefore, time differences among durations for maintenance cause respective stepwise written waveforms to serve as marks.

According to another preferred embodiment, a device is provided for determining a coercive force of a magnetic recording medium, including conveyance means for conveying the magnetic recording medium, traveling quantity detection means for detecting a traveling quantity of the magnetic recording medium, and a write head for writing magnetic information on the magnetic recording medium conveyed by the conveyance means. The device also includes write current waveform storage means for storing a waveform of a write current value of the write head varying relative to a traveling quantity, write current changing means for changing a write current of the write head in accordance with a write current value stored in the write current waveform storage means, and a readout head for reading magnetic information on the magnetic recording medium conveyed by the conveyance means after the write head writes magnetic information on the magnetic recording medium. Also included are determination means for determining a coercive force of the magnetic recording medium on the basis of a voltage read by the readout head, a traveling quantity of the magnetic recording medium at the time of reading, and time-variation of a write current value stored in the write current waveform storage means. The determination means decides a traveling quantity of the magnetic recording medium at the time of reading by the readout head on the basis of that position in which a read voltage value is larger at both ends of that region of the magnetic recording medium, which waveform is read by the readout head.

The both ends of the waveform read region correspond to a writing starting end and a writing terminating end of every waveform read by the readout head.

In this case, a position in which a read voltage value is large is set as a reference position. Therefore, a waveform itself can possess a reference position.

According to another preferred embodiment, a device is provided for determining a coercive force of a magnetic recording medium, including a write head for writing magnetic information on the magnetic recording medium, a readout head for reading magnetic information of the magnetic recording medium, and conveyance means for conveying the write head and the readout head. The device also includes traveling quantity detection means for detecting traveling quantities of the write head and the readout head, write current changing means for changing a write current of the write head while the conveyance means conveys the write head in one direction, and reading control means for causing the conveyance means to convey the write head after the write head writes magnetic information on the magnetic recording medium, and reading magnetic information on the magnetic recording medium. Also included are determination means for determining a coercive force of the magnetic recording medium on the basis of a value, which the reading control means uses the readout head to read, and a traveling quantity of the readout head at the time of reading.

In this case, magnetic information is recorded or reproduced from a magnetic recording medium while the magnetic recording medium remains stationary, and the write head and the readout head are conveyed.

According to another preferred embodiment, a device is provided for determining a coercive force of a magnetic recording medium, including conveyance means for conveying the magnetic recording medium relative to a write head and a readout head, traveling quantity detection means for detecting a traveling quantity caused by the conveyance means, and write current changing means for changing a write current of the magnetic head while the conveyance means moves the magnetic recording medium relative to the write head in one direction. Also included are determination means for causing the readout head to read magnetic information of the magnetic recording medium, which is moved relative to the write head, after the write head writes magnetic information on the magnetic recording medium, and determining a coercive force of the magnetic recording medium on the basis of a voltage read by the readout head and a quantity of movement at the time of reading.

In this case, when magnetic information is recorded on, or reproduced from a magnetic recording medium, a recording or reproducing may be performed while the magnetic recording medium is moved to positions of stationary heads. Also, a recording or reproducing may be performed while heads are moved to a position of the stationary magnetic recording medium. Further, the magnetic processing may be performed while not only one of a magnetic recording medium and heads but also both of them are moved.

According to another preferred embodiment, the device for determining a coercive force of a magnetic recording medium includes a feature that the readout head reads magnetic information of the magnetic recording medium beforehand, and comprises magnetic information storage means for storing magnetic information of the magnetic recording medium read beforehand. After determination by the determination means, the write head writes the magnetic information, stored in the magnetic information storage means, on the magnetic recording medium at a current corresponding to a coercive force determined by the determination means.

In this case, when a magnetic recording medium is conveyed in one direction, a coercive force is found by reading magnetic information stored in the medium. Writing may be performed at a current corresponding to the coercive force.

According to another preferred embodiment, a device is provided for determining a coercive force of a magnetic recording medium, including conveyance means for conveying the magnetic recording medium relative to a write head and a readout head, traveling quantity detection means for detecting a traveling quantity caused by the conveyance means, and write current changing means for changing a write current of the magnetic head while the conveyance means moves the magnetic recording medium relative to the write head in one direction. The device also includes write position detection means for detecting a position in which the write head performs writing on the magnetic recording medium. Also included are determination means for causing the readout head to read magnetic information of the magnetic recording medium, which is moved relative to the readout head, after the write head writes magnetic information on the magnetic recording medium, and determining a coercive force of the magnetic recording medium on the basis of a voltage read by the readout head, a quantity of movement at the time of reading, and the position in which writing is performed.

The write position detection means can be realized by counting the number of bits of written information.

In this case, when magnetic information is recorded on, or reproduced from a magnetic recording medium, the magnetic processing may be performed while one or both of the magnetic recording medium and heads (write head, readout head) are moved. Further, in order to detect a position, in which writing is performed on the magnetic recording medium, it is possible to find a coercive force of the magnetic recording medium from the position of writing. As a result, magnetic information can be written by finding an appropriate write current value suited to the coercive force of the magnetic recording medium.

DETAILED DESCRIPTION OF THE INVENTION

Embodiments of the invention will be described below with reference to the drawings.

FIRST EMBODIMENT

The drawings show a card reader for writing and reading magnetic information from a magnetic card.

Figure 1:
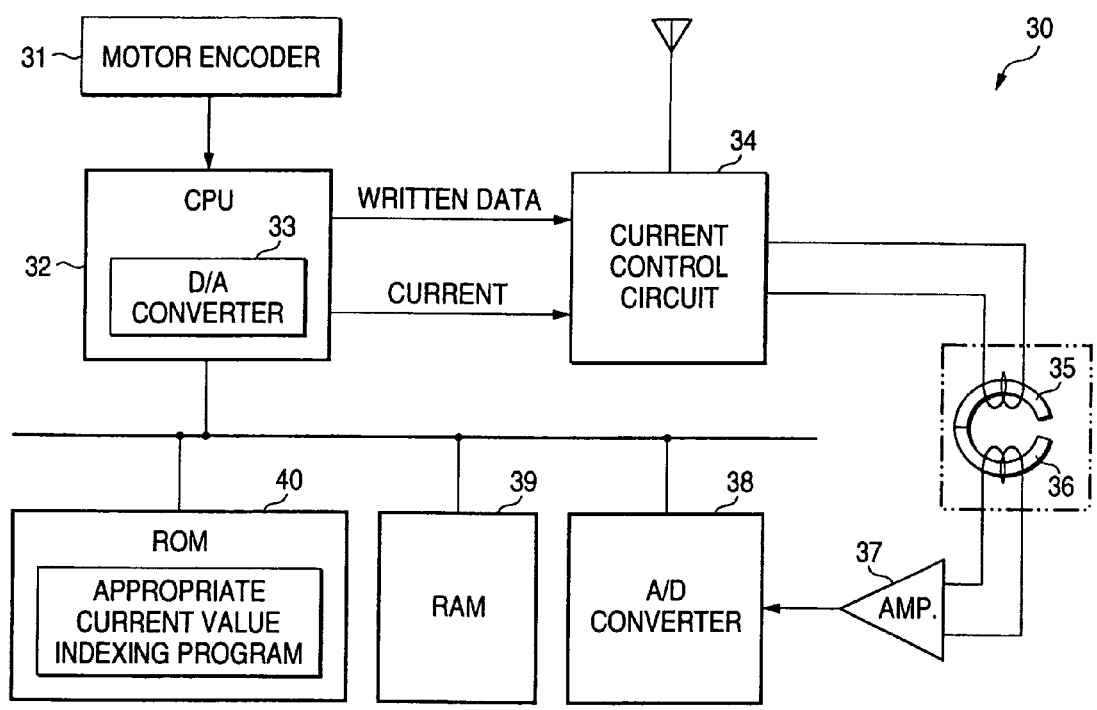
FIG. 1 is a control circuit block diagram of a card reader according to a first embodiment.

FIG. 1 shows a control circuit block diagram of a card reader 30. The card reader 30 has a circuit configuration composed of a motor encoder 31, central processing unit (CPU) 32, digital/analog (D/A) converter 33, current control circuit 34, write head 35, readout head 36, amplifier 37, analog/digital (A/D) converter 38, random access memory (RAM) 39, and a read-only memory (ROM) 40.

The motor encoder 31 is an encoder provided on a motor of a conveyance system. The motor encoder 31 causes a photosensor to detect the number of pulses, when the motor rotates and outputs, through slits on a disk provided on a motor shaft. Thereby, the CPU 32 calculates driving of the motor and the number of revolutions at that time.

The CPU 32 executes the control processing of equipment connected to the CPU 32 in accordance with a program stored in the ROM 40. In the case where magnetic information is written on a magnetic card in accordance with the program, an appropriate write current value required for regular writing is found from results of preliminary writing on the magnetic card and regular writing is done.

First, in the case where preliminary writing is done, a write current is increased stepwise and preliminary writing is done at a plurality of different current values including a large current value and a small current value. The plurality of different current values is stored as preliminary data in the ROM 40. When reading the preliminary data having undergone preliminary writing, the CPU 32 finds from results of preliminary writing an appropriate value of a write current suited to respective coercive forces of every magnetic card. The appropriate value thus found is set as a current value in regular writing, and the current value is stored as a regular data in the ROM 40. Regular writing is done at the current value of the regular data.

The D/A converter 33 converts digital data into analog signals. The D/A converter 33 sets a write current for magnetic information (preliminary data and regular data), which is written on a magnetic card C (see FIGS. 3A to 3C). Concretely, a process for stepwise increase of a current supplied to the current control circuit 34 is executed on the basis of digital data, which is set in a manner to increase stepwise a current value.

The current control circuit 34 outputs to the write head 35 a write data commanded from the CPU 32 as a current value supplied from the D/A converter 33. The write head 35 changes magnetic flux to thereby write the write data as the current value on magnetic stripes St (see FIGS. 3A to 3C) of the magnetic card C.

The readout head 36 reads a voltage value (output value) obtained when data written on the magnetic stripes St of the magnetic card C is read.

The amplifier 37 outputs to the A/D converter 38 a voltage value read by the readout head 36.

The A/D converter 38 converts an analog signal into a digital data. Also, the A/D converter 38 reads the voltage value by waveform to output the same as waveform data. The RAM 39 temporarily stores data or the like required for the control processing in the CPU 32.

The ROM 40 stores necessary programs such as an appropriate current value indexing program. The appropriate current value indexing program preserves an initial current value (minimum current value) data, predetermined maximum current value (maximum current value) data, and a preliminary data. Also, the preliminary data is sent to the current control circuit 34 in order to calculate an appropriate write current value. Further, a preliminary writing processing is executed to stepwise increase a current value from the minimum current value data to the maximum current value data to send the same to the current control circuit 34 from the D/A converter 33. At this time, the motor provided with the motor encoder 31 moves the magnetic card C to control for successively writing a preliminary data having different current values.

When the preliminary writing process is terminated, a voltage value acquired from the readout head 36 via the amplifier 37 is converted into waveform data in the A/D converter 38. A peak value of amplitude of the converted waveform data is indexed and waveform data just below the peak value is made an appropriate value to be set at a write current value of the regular data.

In this case, the reason why an appropriate write current value is set just below the peak value of amplitude is that an output voltage is put in a saturated state when the peak value of amplitude is exceeded (see FIG. 4). Therefore, a position before an output voltage is saturated is set as an appropriate write current value.

With the above arrangement, the CPU 32 writes the preliminary data and the regular data on the magnetic stripes of the magnetic card to be able to read the preliminary data and the regular data and to read an output value thereof.

Figure 2:
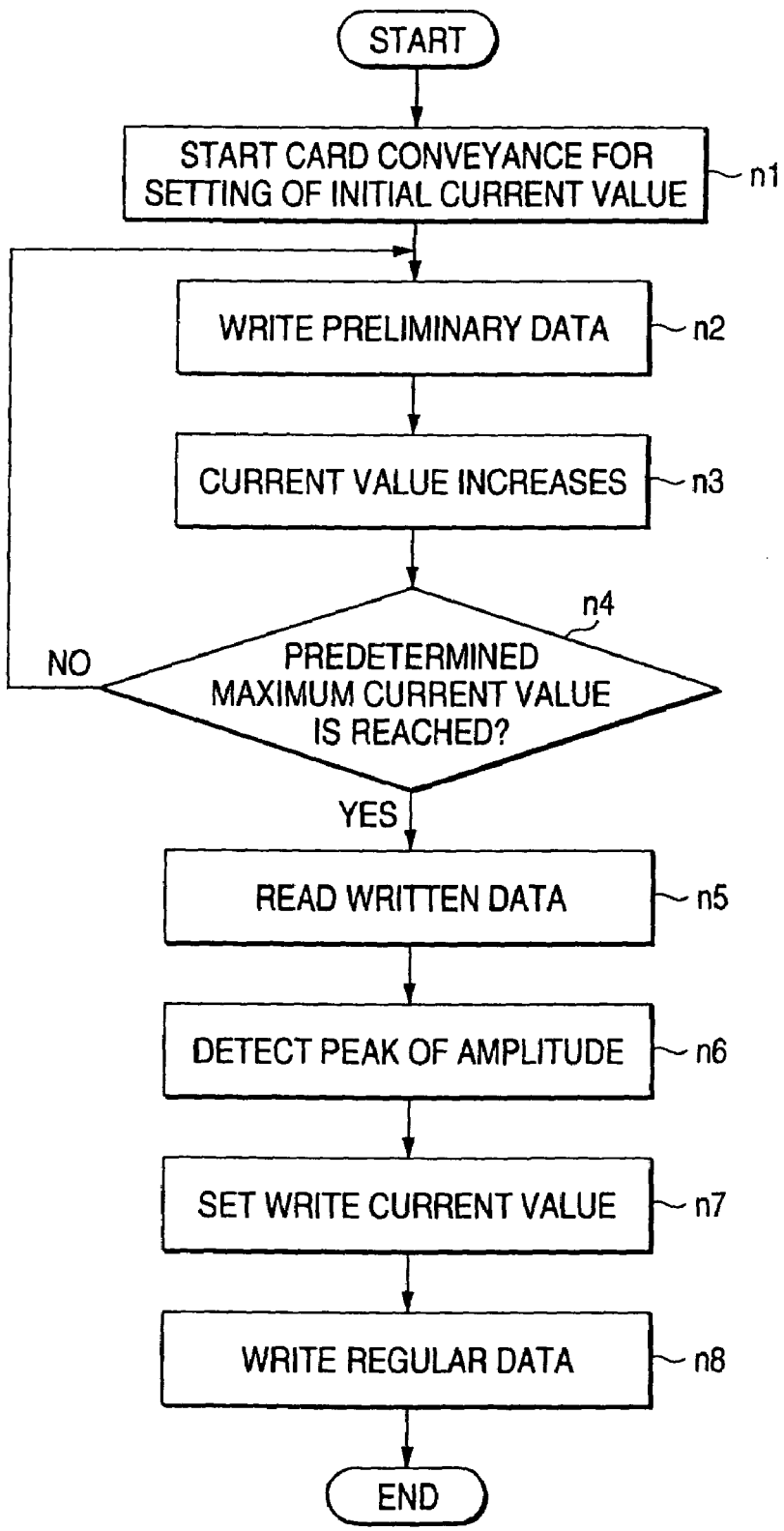
FIG. 2 is a flowchart of a processing operation of the card reader according to the first embodiment.

Subsequently, the processing operation of the card reader 30 will be described with reference to a flowchart in FIG. 2 and the magnetic processing operation in FIGS. 3A to 3C.

The CPU 32 starts the appropriate current value indexing program. A minimum current value is set and conveyance of the magnetic card C is started (STEP n1).

Figure 3A:
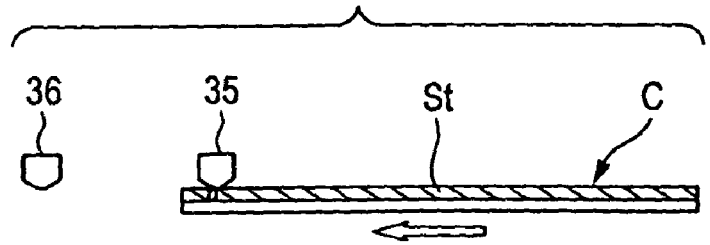
FIGS. 3A to 3C are views illustrating a magnetic processing operation of the card reader according to the first embodiment.

The CPU 32 causes the write head 35 to write a present current value (digital data) as a preliminary data on the magnetic stripes St of the magnetic card C as shown in FIG. 3A (STEP n2).

A current value is increased by a determined quantity (STEP n3).

In the case where the increased current value is less than a maximum current value, the processing is returned to STEP n2 to repeat writing of the preliminary data until the increased current value reaches the maximum current value (STEP n4).

Figure 3B:
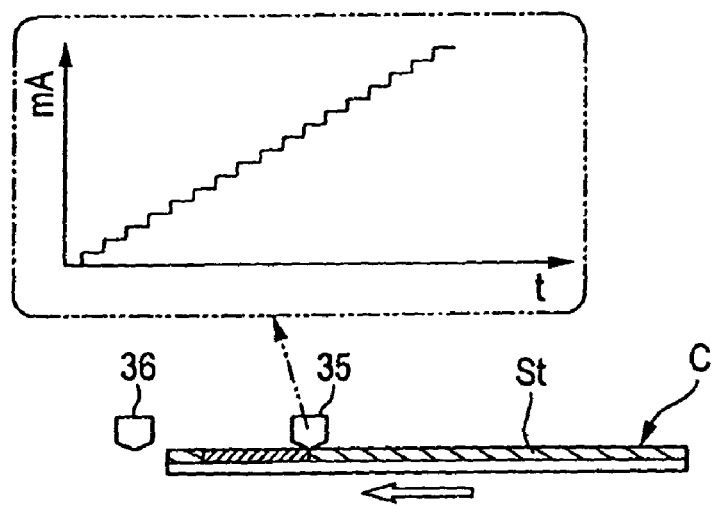

By means of such repetition, a current value is increased stepwise for writing of the preliminary data as shown in FIG. 3B. In the figure, a graph indicated by imaginary lines represents a manner in which current is increased and written repeatedly, with the abscissa indicating time t and the ordinate indicating current intensity mA.

In the case where the maximum current value is reached, the written preliminary data is read by the readout head 36 (STEP n5).

Figure 3C:
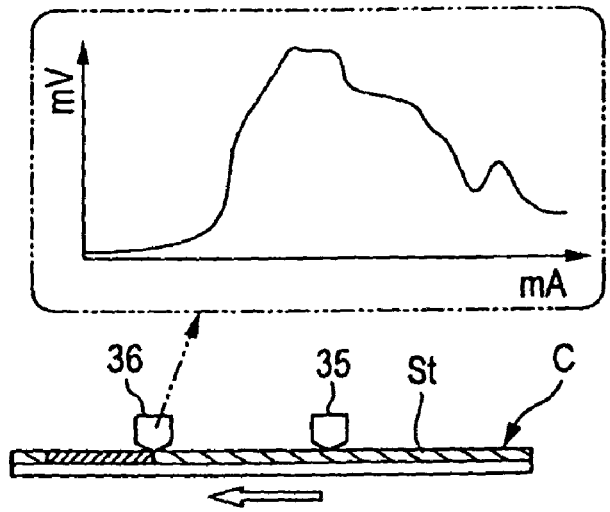

At this time, the readout head 36 reads a voltage value of the preliminary data from the magnetic stripes St to be able to obtain a waveform data of voltage as indicated by imaginary lines in FIG. 3C. A graph representing the waveform data represents changes in voltage value output from the magnetic stripes St with the abscissa indicating current intensity mA and the ordinate indicating voltage intensity mV.

The waveform data acquired by reading of the preliminary data is converted into digital data by the A/D converter 38; so that a peak value of amplitude is detected (STEP n6).

A current value corresponding to a position just below the peak value is set as a write current value (STEP n7).

The CPU 32 terminates the appropriate current value indexing program, and regular writing of the calculated (acquired) appropriate current value on the magnetic stripes St of the magnetic card C is executed as regular data (STEP n8).

Figure 4:
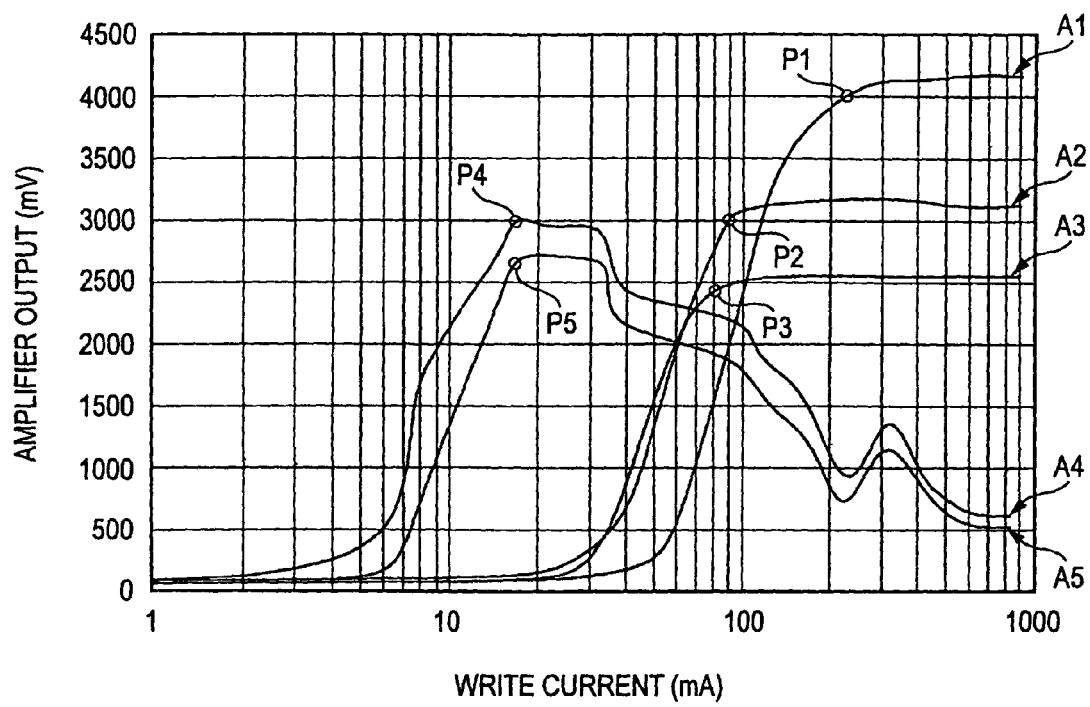
FIG. 4 is a graph showing examples of waveform datum of different magnetic cards according to the first embodiment.

The above operation makes it possible to set first to fifth current values P1 to P5 suited to magnetic cards C having different coercive forces indicated in first to fifth waveform datum A1 to A5 for various magnetic cards, as indicated in the graph in FIG. 4. That is, the first current value P1 (about 215 mA) is set for a magnetic card of the first waveform data A1, and the second current value P2 (about 89 mA) is set for a magnetic card of the second waveform data A2. The third current value P3 (about 72 mA) is set for a magnetic card of the third waveform data A3, and the fourth current value P4 (about 18 mA) is set for a magnetic card of the fourth waveform data A4. The fifth current value P5 (about 17 mA) is set for a magnetic card of the fifth waveform data A5, all so that regular writing can be executed at an appropriate value.

In this case, the first to third waveform datum A1 to A3 correspond to magnetic cards C of high coercive forces with write current values being high when an output voltage is high. In contrast thereto, the fourth and fifth waveform datum A4, A5 correspond to magnetic cards C of low coercive forces with write current values being small when an output voltage is high.

However, a saturated state comes out when respective current values P1 to P5 are exceeded. Accordingly, in order to obtain safety (stability) in writing, current values suited to writing may be set at respective current values when saturation comes out.

Also, with magnetic cards C of high coercive forces indicated in the first to third waveform datum A1 to A3, in order to obtain safety (stability) in writing, setting at larger current values (for example, current values twice that at the time of saturation) than those at the time of saturation is possible.

In this manner, the card reader 30 can search for an appropriate current value for any magnetic card C among magnetic cards of high coercive forces and magnetic cards of low coercive forces to execute regular writing.

In particular, writing of the preliminary data is completed in a motion of a magnetic card C passing the write head 35 once in one direction. Also, reading of the preliminary data is completed in a motion of a magnetic card C passing the readout head 36 once.

While the above embodiment executes writing and reading of the preliminary data in a motion of single passage of a magnetic card C, it is not limited thereto. In, for example, a card reader for reciprocatory conveyance of a magnetic card C, setting may be made such that writing of the preliminary data is executed in a motion of single passage, and reading of the preliminary data is executed in a subsequent motion of passage of a magnetic card C in a return direction. In this case, the preliminary data can be written on the whole magnetic stripes St without depending upon a spacing between the write head 35 and the readout head 36.

SECOND EMBODIMENT

Figure 5:
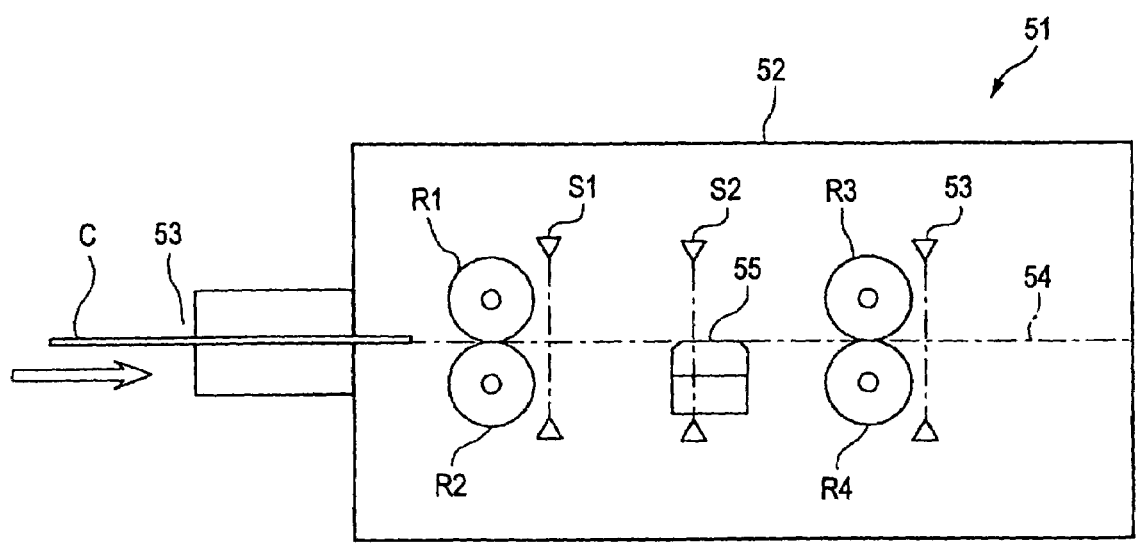
FIG. 5 is a cross sectional view showing an outline of a card reader according to a second embodiment.

FIG. 5 shows an outline of a cross section of a card reader 51 provided with a device for determining a coercive force of a magnetic card.

The card reader 51 comprises a card insertion port 53 provided on a front surface of a body 52, through which port a magnetic card C is inserted or returned. The card reader 51 internally includes a card conveyance path 54 which permits an inserted magnetic card C to be conveyed for forward and backward movements. The card conveyance path 54 is connected to the card insertion port.

Arranged around the card conveyance path 54 to extend deep in the interior from the card insertion port 53 are a pair of upper and lower forward conveyance rollers R1, R2, a magnetic head 55, and a pair of upper and lower rearward conveyance rollers R3, R4. Further, first to third detection sensors S1 to S3 are arranged in three positions.

Rotating shafts of pairs of vertically opposed conveyance rollers among the conveyance rollers R1 to R4 are connected in a manner to be turned by torque from a motor. The motor is not shown in the FIG. 5. As the motor rotates, the conveyance rollers rotate.

Thereby, the inserted magnetic card C is interposed between the upper and lower forward conveyance rollers R1, R2 and between the upper and lower rearward conveyance rollers R3, R4. The inserted magnetic card C is conveyed in a take-in direction or a return direction.

The motor is rotated at a constant speed and the conveyance rollers are rotated whereby the magnetic card C is conveyed at a constant speed.

When the magnetic card C is conveyed to come into contact with the magnetic head 55, the magnetic card C is subjected to magnetic writing or reading. One magnetic head 55 is arranged about the card conveyance path 54 to perform magnetic writing and reading on the magnetic card C. Further, the first to third detection sensors S1 to S3 detect a position on the card conveyance path 54, in which the magnetic card C is present.

Figure 6:
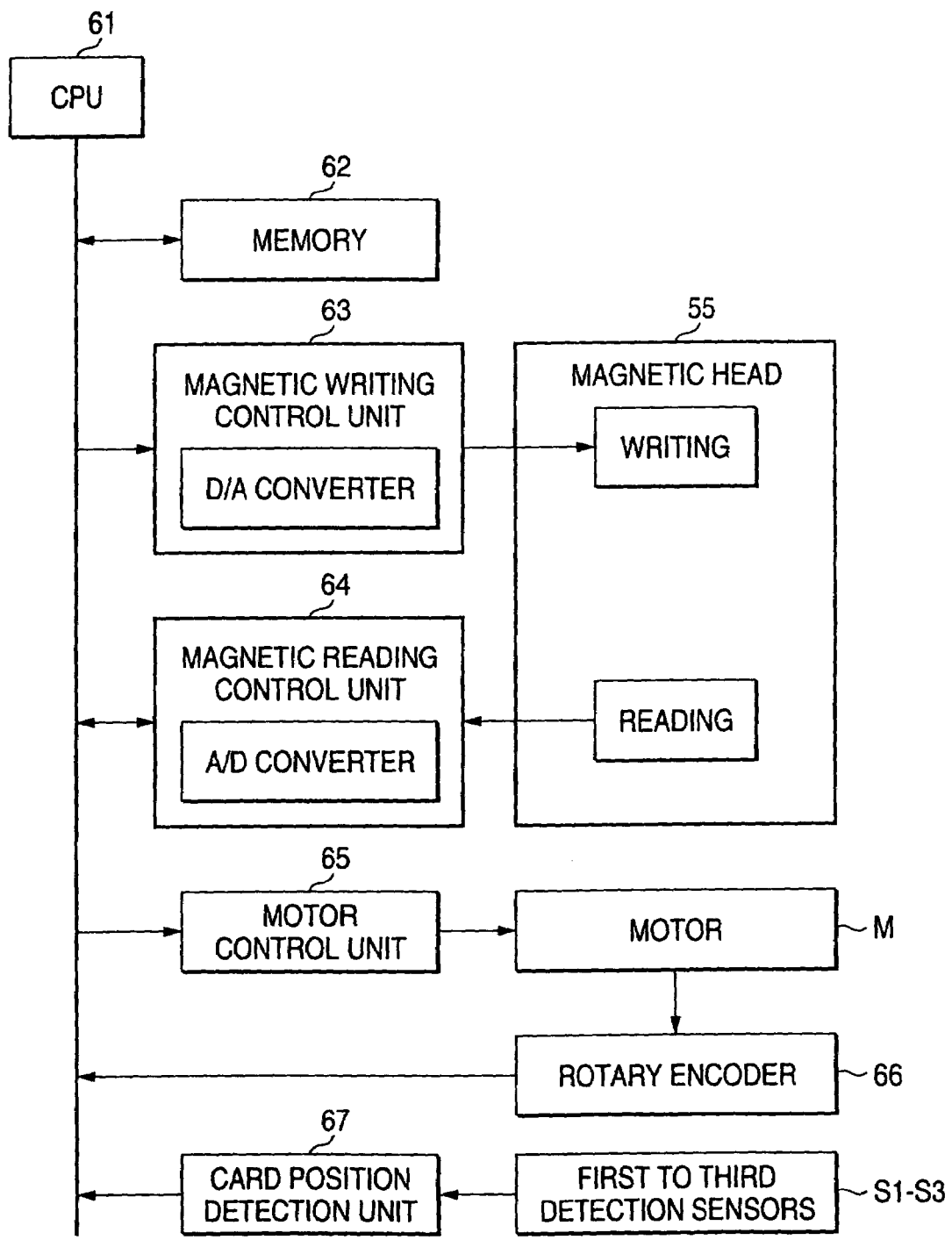
FIG. 6 is a controlling block diagram for the card reader according to the second embodiment.

FIG. 6 is a controlling block diagram for the card reader 51.

The card reader 51 comprises a CPU 61, memory 62, magnetic writing control unit 63, magnetic reading control unit 64, magnetic head 55, motor control unit 65, motor M, rotary encoder 66, card position detection unit 67, and the first to third detection sensors S1 to S3.

The CPU 61 controls equipment connected to the CPU 61 in accordance with a program stored in the memory 62.

The memory 62 stores programs, datum, or the like for indexing appropriate current values such as write current values suited to different coercive force for every magnetic card.

The magnetic writing control unit 63 includes a D/A converter. The D/A converter converts a digital data, which is received from the CPU 61, into analog signals. The magnetic writing control unit 63 controls output current values corresponding to the analog signals at certain periods.

The magnetic reading control unit 64 performs reading control by reading tracks from magnetic stripes. The magnetic reading control unit 64 amplifies a signal received from the magnetic head 55. The A/D converter converts an analog signal into a digital data. The converted digital data is sent to the CPU 61.

The magnetic head 55 generates a magnetic field upon application of a current. A current as added is varied to write magnetic information on a magnetic card C, which is brought into contact with the magnetic head 55. The magnetic card C is conveyed to the magnetic head 55 whereby much information is sequentially written.

A magnetic field is generated by conveying the magnetic card C, on which magnetic information has been written, while bringing the magnetic card into contact with the magnetic head. Voltage is generated on the magnetic head 55 corresponding to a change in the magnetic field. The magnetic head 55 detects a change in the magnetic field to read information recorded on the magnetic card.

Hereupon, at the time of the above-mentioned writing, regular writing is performed by finding an appropriate write current value required for regular writing from results of preliminary writing on the magnetic card C. First, when the preliminary writing is to be done, a write current is increased stepwise and preliminary writing is done at a plurality of different current values including a large current value and a low current value at that time. The plurality of different current values is stored as a preliminary data in the memory 62. And when reading the preliminary data having undergone preliminary writing from the magnetic card C, the CPU 61 finds from results of preliminary writing an appropriate value of a write current suited to respective coercive forces of every magnetic card. The appropriate value thus found is set as a current value in regular writing, and the current value is stored as a regular data in the memory 62. And regular writing is done at the current value of the regular data.

The motor control unit 65 receives a drive signal or a stoppage signal from the CPU 61 to control the motor M so as to rotate the same at a constant rotating speed. Also, by means of rotation of the motor M in a forward direction or in a rearward direction, the magnetic card C is conveyed on the card conveyance path 54 in a taking-in direction or in a return direction.

The rotary encoder 66 causes a photosensor to detect the number of pulses through slits on a disk provided on a motor shaft of the motor M and calculates the number of rotations.

The card position detection unit 67 acquires respective detected signals from the first to third detection sensors S1 to S3 arranged around the card conveyance path 54. And a position, in which the magnetic card C is present, is output to the CPU 61.

In accordance with a program stored in the memory 62, the CPU 61 executes the writing processing of preliminary data at a stepwise increased current value from a minimum current value to a maximum current value. At this time, the motor M moves the magnetic card C in the taking-in direction to write the preliminary data sequentially.

When the preliminary writing is terminated, the magnetic head 55 reads magnetic information, preliminarily written, from the magnetic card C. A voltage value received from the magnetic head 55 by the magnetic reading control unit 64 is received as a waveform data. A waveform peak of the waveform data is indexed, and a waveform data just below the waveform peak is made an appropriate value to be set at a write current value suited to writing of the regular data.

In this case, the reason why an appropriate write current value is set just below the peak value of amplitude is that an output voltage is put in a saturated state when the peak value of amplitude is exceeded (see FIG. 4). In order to prevent an output voltage from being saturated, a position before an output voltage is saturated is set as an appropriate write current value.

Subsequently, an explanation will be given to the case where an appropriate write current value is found from results of determining a coercive force of a magnetic card.

The CPU 61 controls writing magnetic information on a magnetic card C, which is being conveyed on the card conveyance path 54 in one direction, at a plurality of different current values via the magnetic head 55 during conveyance in the one direction. After the magnetic information is written, the magnetic head 55 reads magnetic information of the magnetic card C conveyed on the card conveyance path 54. A coercive force of the magnetic card C is determined on the basis of the read voltage, along with traveling quantity of the magnetic card C at the time of reading. And a current value corresponding to the coercive force is set as a current value suited to writing.

In particular, the magnetic head 55 writes magnetic information on the magnetic card C at a plurality of different current values, which are increased stepwise during conveyance in one direction. Then only a single pass in one direction makes it possible to write a preliminary data. Therefore, one conveyance suffices while a write current value is varied to a certain value from another value. Further, when the magnetic card C is conveyed in a return direction, the magnetic head 55 reads whether information is normally written, by a current value at the time of writing so as to be capable of confirmation.

In detection of a write position in the magnetic card C, a period of a pulse command from the CPU 61 to the motor M and a period of a write command from the CPU 61 to the magnetic head 55 are in proportional connection. Thereby, a write position corresponding to written magnetic information on a magnetic card can be known by reading a written data from the magnetic card and counting the number of bits thereof. Therefore, a position, in which magnetic information is written on the magnetic card C can be detected by counting a period of a write command to the motor M.

As other measures of detecting a write position on the magnetic card C, it suffices to count the number of bits of written information. Also, it suffices to measure a quantity of rotation of a rotary encoder, which outputs a quantity of rotation of the motor M.

Further, it suffices to bring a roller, which is connected to a rotary encoder, into contact with the magnetic card C to measure a quantity of rotation thereof. The reason why both measures may be used is that measurements are proportional to a traveling quantity of the magnetic card C.

Meanwhile, when magnetic information is read from the magnetic card C, a position of reading can be detected by measuring a quantity of rotation of a rotary encoder, which outputs a quantity of rotation of the motor M. Also, it suffices to bring a roller of a rotary encoder into contact with the magnetic card C to measure a quantity of rotation thereof.

Figure 7:
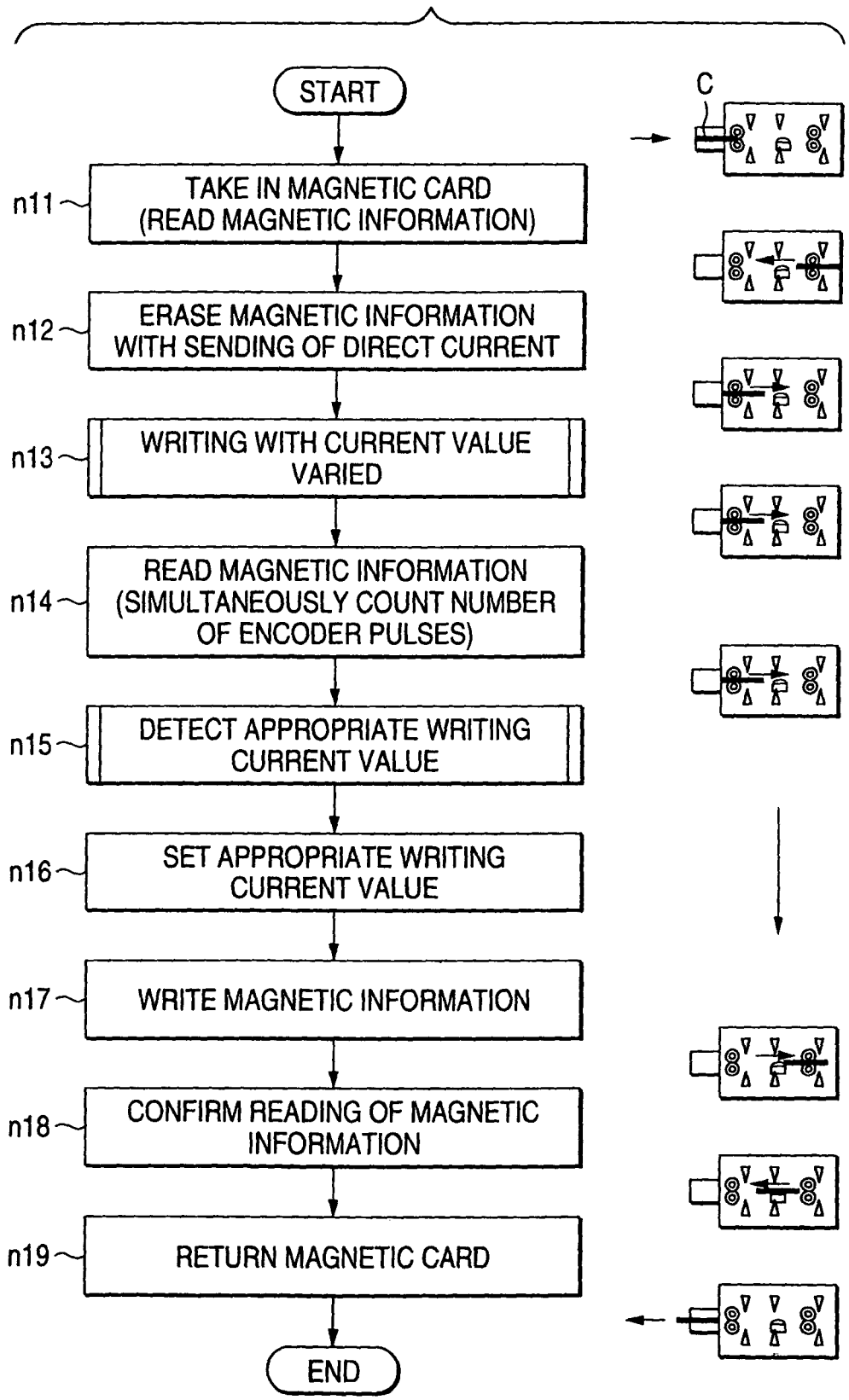
FIG. 7 is a flowchart of a card processing operation according to the second embodiment.

A main processing operation of the card reader 51 is described with reference to figures showing positions of the magnetic card C as conveyed and a flowchart in FIG. 7. FIG. 7 shows a sequence of respective processes on a left side therein. Cross sectional views of respective card readers 51 on a right side show positions of the magnetic card C when the respective processes are terminated. Arrows close to the magnetic card C indicate directions, in which the magnetic card C is moved in a subsequent processing.

The motor control unit 65 drives the motor M to take in a magnetic card C inserted into the card insertion port 53 of the card reader 51. The magnetic head 55 reads magnetic information recorded on magnetic stripes of the magnetic card C during conveyance in a card receiving direction. The read magnetic information is stored as an initial data in the memory 62 (STEP n11).

After reading, the magnetic card C is conveyed in a return direction. When the magnetic card contacts the magnetic head 55, a current for data erasing is applied on the magnetic head 55 to erase magnetic information on the magnetic card C. Therefore, the magnetic card is put in a standby state for preliminary writing (STEP n12).

When magnetic information on the magnetic card C is erased, the magnetic card C again is forwardly conveyed in a receiving direction. During such conveyance, the magnetic head 55 performs preliminary writing. This preliminary writing is one in which a current value is varied stepwise from a low current value to a large current value (see FIGS. 8 and 9) (STEP n13).

After the preliminary writing, in which a current value is varied stepwise, the magnetic card C is conveyed in the return direction, and the magnetic head 55 reads magnetic information preliminarily written on the magnetic card C. At this time, the number of encoder pulses is simultaneously counted. Thereby, the number of revolutions of the motor M is acquired. Since the number of revolutions of the motor M and a traveling quantity of the magnetic card C are proportional, a traveling quantity of the magnetic card C can be found from the number of encoder pulses. Such traveling quantity is found to make a position of preliminary writing and a position of written data correspond to each other (STEP n14).

After reading of preliminary writing information, the magnetic card is returned to an original position toward the card insertion port 53 to stand by for subsequent regular writing. The CPU 61 detects an appropriate write current value from the read magnetic information (see FIG. 10) (STEP n15).

The CPU 61 sets an appropriate write current value from results of such detection (STEP n16).

When an appropriate write current value is set, the CPU 61 proceeds to regular writing to convey the magnetic card C in the taking-in direction. While the magnetic card is conveyed, the magnetic head 55 writes magnetic information on the magnetic card C at a write current value suited to writing. The written magnetic information is an initial data read in STEP n11. Also, predetermined information stored in the memory 62 may be written on the magnetic card. Thereby, regular writing is terminated (STEP n17).

When such regular writing is terminated, the magnetic card C, on which regular writing is performed, is subsequently conveyed in the return direction. During the conveyance in the return direction, the magnetic head 55 reads magnetic information from the magnetic card C. At this time, it is confirmed whether magnetic information is normally magnetic-written on the magnetic card C (STEP n18).

When it is confirmed that the read data corresponds to the written data, the magnetic card C is returned to the card insertion port 53 (STEP n19). A user can take out the magnetic card C from the insertion port of the card reader 51. Thereby, the main processing operation of a single magnetic card C in the card reader 51 is terminated.

An explanation will be given of an example of preliminary writing at above-described STEP n13, in which a current value is varied stepwise.

The memory 62 stores a waveform of a write current value of the magnetic head 55, which varies corresponding to a traveling quantity. A write current value applied to the magnetic head 55 is changed in accordance with a write current value stored in the memory 62. In this case, a waveform varying corresponding to a traveling quantity is a waveform stepwise representing a changing state of a current value at the time of writing in keeping with a change of a conveyance distance.

Figure 8:
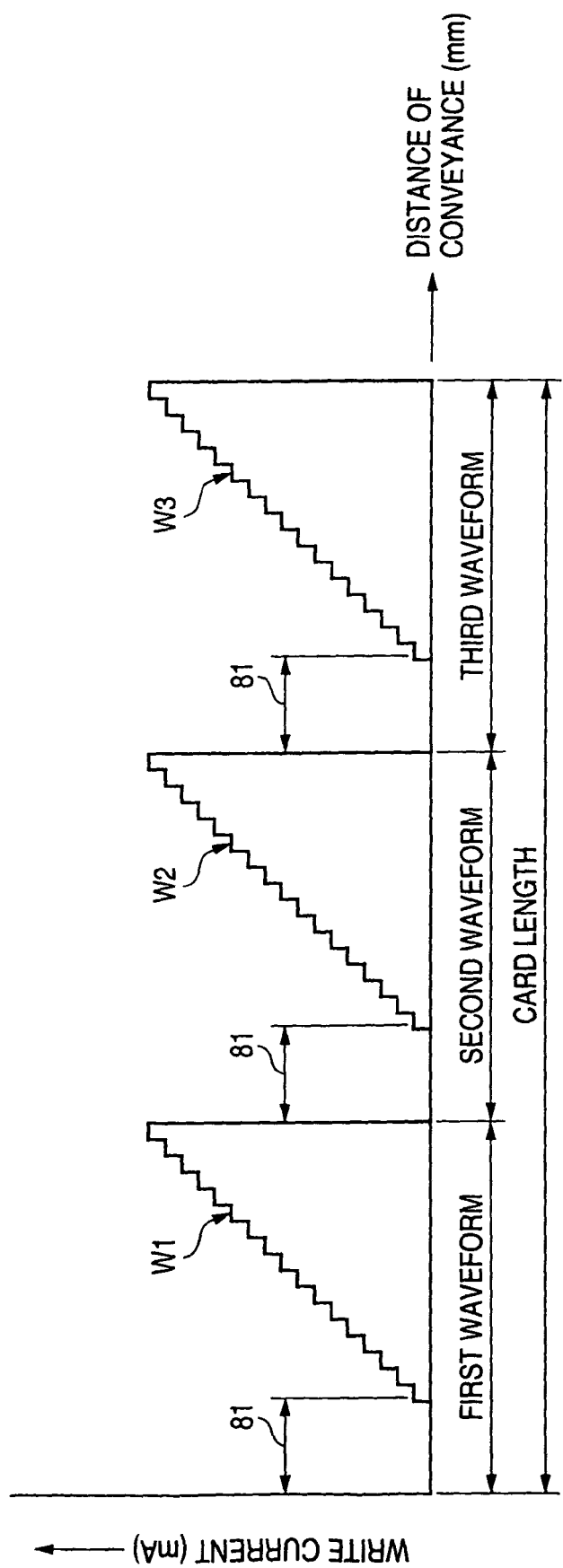
FIG. 8 is a view showing three waveforms at the time of preliminary writing according to the second embodiment.

In this case, a waveform is not one for one magnetic stripe but the same waveform is repeated plural times for one magnetic stripe. For example, as shown in FIG. 8, the same waveform is repeated three times on magnetic stripes formed lengthwise on a magnetic card C. According to this waveform, a current value applied to the magnetic head 55 is changed and magnetic information is written on magnetic stripes. Thereby, first to third waveforms W1 to W3 are obtained according to the order of writing. As a result, suitability of the three waveforms W1 to W3 as acquired can be determined through a comparison among them even when abnormality is generated in any one of the waveforms, since the same waveform is written.

For example, when two among the three waveforms are the same and one waveform is different from other ones, one waveform is considered to be a bad, abnormal one. As a result, a coercive force can be determined from waveforms except the abnormal one. The cause for generation of abnormality in waveforms resides in scratches on magnetic stripe surfaces, or adherence of dirt to the surfaces.

Other waveforms can also be formed by a function which represents a current value at the time of writing in keeping with a change of a conveyance distance. Also, instead of a conveyance distance, it is also possible to use a conveyance time.

Also, writing stoppage portions 81 are formed, in which writing is not done for slight durations to separate the waveforms prior to writing thereof when the three waveforms W1 to W3 are repeatedly written. Thereby, the writing stoppage portions 81 interpose between the waveforms. Accordingly, since the writing stoppage portions 81 can be set in reference positions of the respective waveforms W1 to W3, the waveforms W1 to W3 repeatedly written can be definitely distinguished from one another.

Figure 9:
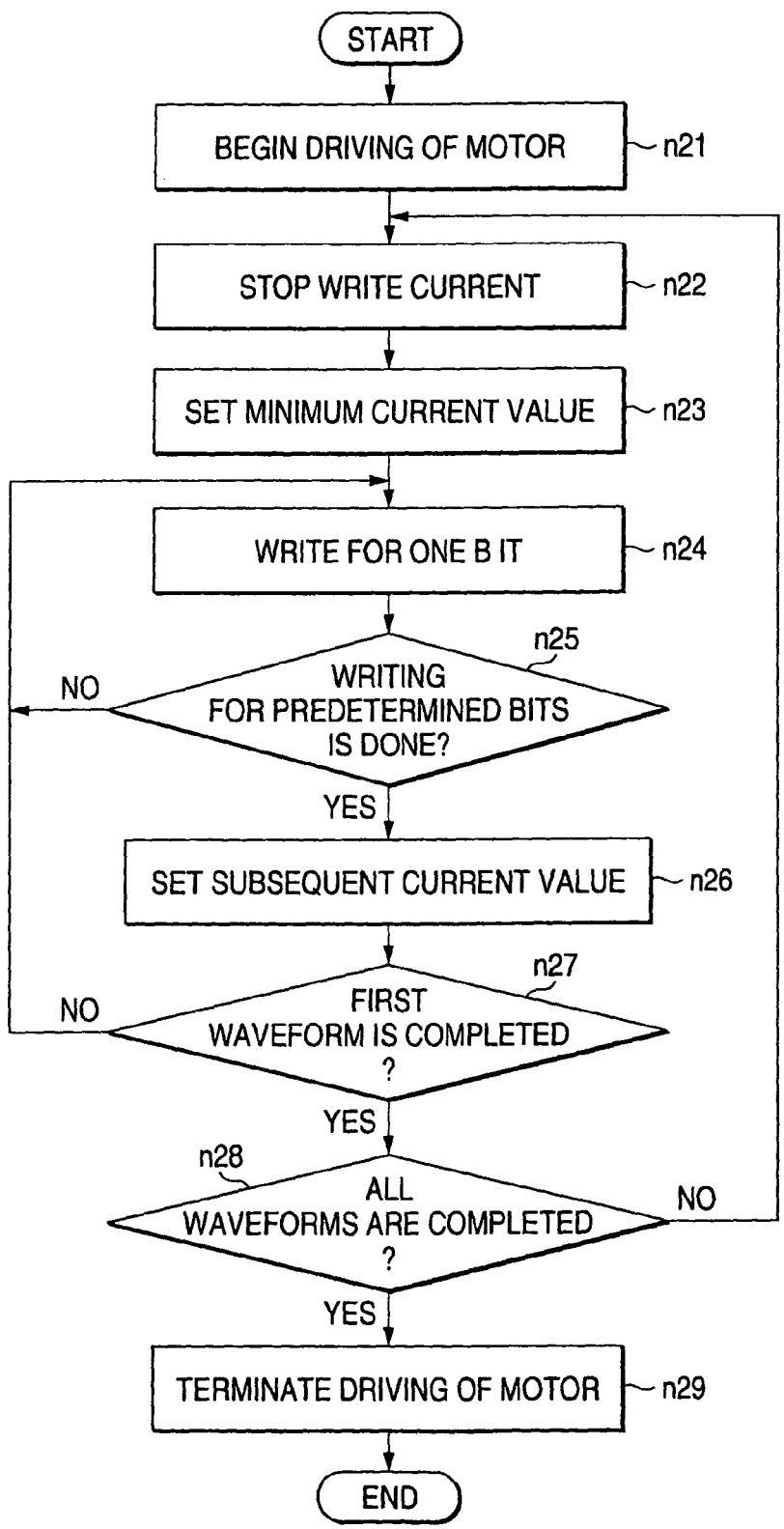
FIG. 9 is a flowchart illustrating a waveform writing operation according to the second embodiment.

An explanation follows of an operation in which preliminary writing is done while a current value is changed stepwise, with reference to a flowchart shown in FIG. 9.

In order to perform preliminary writing on a magnetic card C, the CPU 61 first drives the motor M. Thereby, the magnetic card is conveyed at a certain speed (STEP n21).

Before waveforms are written during the conveyance, the CPU 61 temporarily stops a write current for the magnetic head 55 via the magnetic writing control unit 63 to cause a writing operation to stand by for a period of time, during which the writing stoppage portions 81 are obtained (STEP n22).

When the stand-by time has elapsed, the magnetic writing control unit 63 first sets writing at a minimum current value (STEP n23).

Information for one bit is written at the minimum current value (STEP n24).

It is determined whether predetermined information for one bit has been written (STEP n25). When it is determined that predetermined information for one bit has not been written, information for one bit is written again (STEP n24). When it is determined that predetermined information for one bit has been written, a subsequent current value is set for writing with a current value increased stepwise (STEP n26). In the next step it is determined whether writing of the first waveform has been completed (STEP n27). When writing of the first waveform has not been completed, information for one bit is written again (STEP n24).

And until writing has been completed at a current value based on the first waveform W1 (see FIG. 8), a writing operation is executed repeatedly with a current value being increased bit by bit (STEP n24 to STEP n27).

Thereafter, when it is determined that writing based on the first waveform W1 has been completed (STEP n27), the processing proceeds to writing based on formation of a subsequent waveform. In this case, a writing operation is caused to stand by a time during the writing stoppage positions 81. Within that duration, in which a magnetic card C is conveyed a distance corresponding to the writing stoppage portions 81, writing at the minimum current value, from STEP n22 on, is executed. In this manner, information is written bit by bit at a current value based on the second waveform W2 (see FIG. 8). After writing based on the second waveform W2, the same procedure is repeated, in which information is written bit by bit at a current value based on the third waveform W3 (see FIG. 8) (STEP n28).

When such writing is terminated, a write current is stopped and rotation and output of the motor M are stopped to stop conveyance of the magnetic card C, thus terminating preliminary writing (STEP n29).

In this manner, information is written at current values based on all the waveforms W1 to W3. While the magnetic card C is conveyed from a starting end to a terminating end on the card conveyance path 54 in one direction, three waveforms W1 to W3 are written.

Figure 10:
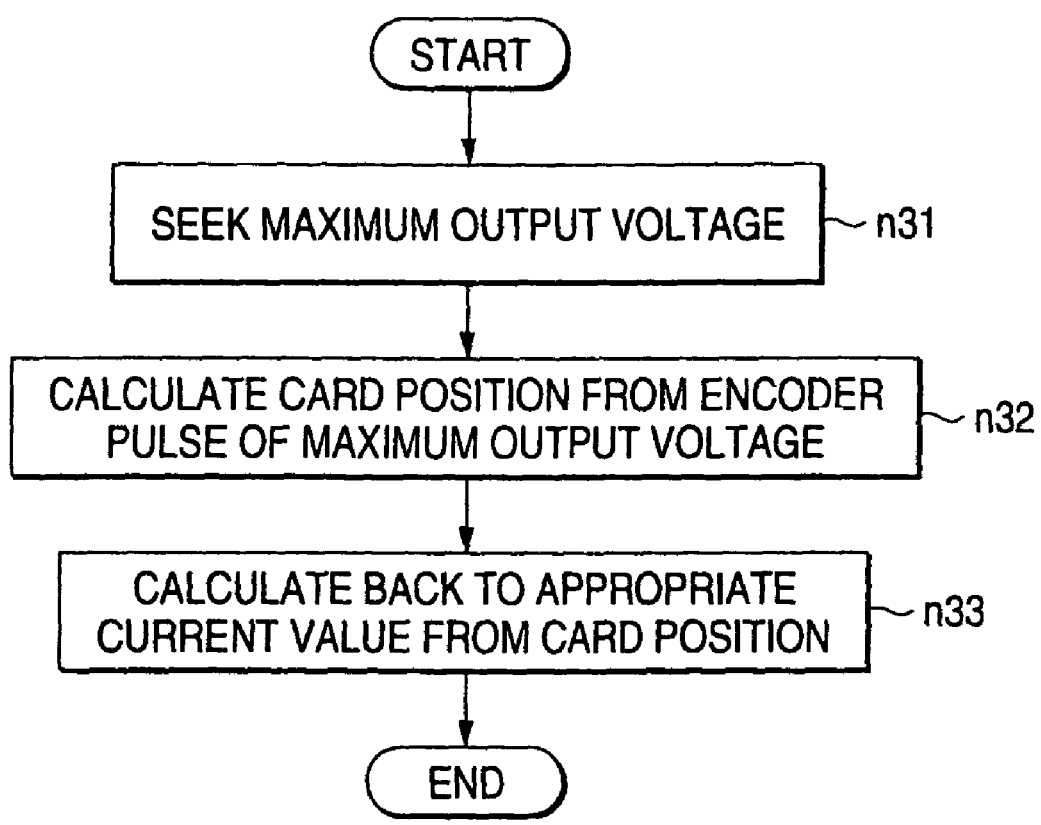
FIG. 10 is a flowchart for finding an appropriate write current value according to the second embodiment.

Subsequently, an explanation will be given to an operation of detection of an appropriate write current value required for regular writing with reference to a flowchart shown in FIG. 10.

The magnetic card C, having been moved to the terminating end on the card conveyance path 54 after termination of preliminary writing, is conveyed on the card conveyance path 54 in the return direction. While being conveyed in this manner, the magnetic card C comes into contact with the magnetic head 55, so that voltage generated on the magnetic head 55 is read on the basis of magnetic information written on the magnetic card C. A maximum output voltage is sought from the read voltage value (STEP n31).

A card position of the magnetic card C is calculated and found from a motor signal (encoder pulse) when the maximum output voltage is obtained (STEP n32).

A current value of information having been written at the time of preliminary writing is found from the thus found card position. This becomes an appropriate current value for regular writing on the magnetic card C (STEP n33).

Figure 11:
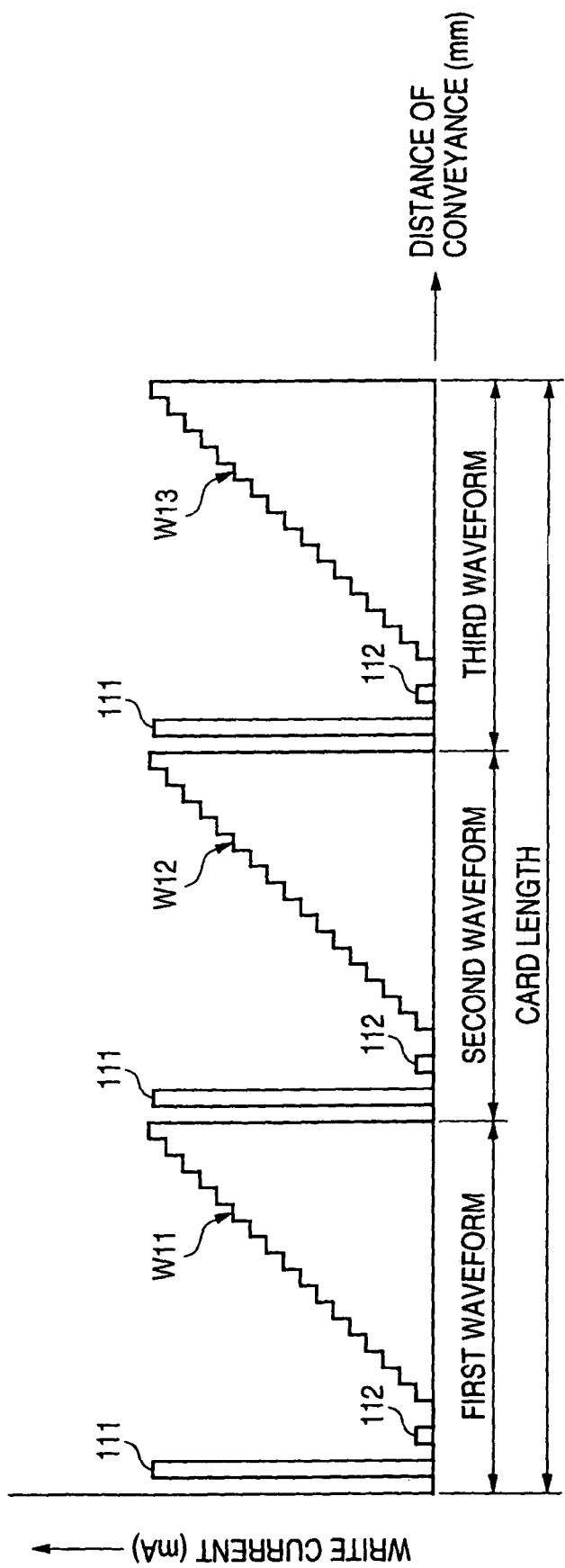
FIG. 11 is a waveform view showing waveforms with mark waveforms, according to the second embodiment.

Subsequently, an explanation will be given to the case where information is written at a current value based on a small mark waveform, which makes a reference position, in the case of finding the card position. FIG. 11 shows first to third waveforms W11 to W13 corresponding to changing write currents stored in the memory 62. In addition to the three waveforms, a mark waveform 111 of a current value for high coercive forces and a mark waveform 112 of a current value for low coercive forces are stored in the memory 62.

These mark waveforms 111, 112 maintain write currents of the magnetic head 55 at magnitudes (represented by bar chart in the figure) of mark waveforms only for a short conveyance duration, during which small mark waveforms are formed.

Therefore, prior to writing of the respective waveforms W11 to W13, information is written at currents based on different mark waveforms 111, 112 from the waveforms W11 to W13. The provision of these mark waveforms 111, 112 makes it possible to distinguish all the three waveforms W11 to W13 from one another. Also, these mark waveforms 111, 112 can be found when conveyance positions of the magnetic card C are to be found, since the waveforms are set in reference positions for positioning of waveforms.

In the case of performing preliminary writing, in which these mark waveforms 111, 112 are written, the same processing as the processing operation of the magnetic card C described in the flowchart in FIG. 7 can be executed. Also, in the case where the magnetic head 55 reads magnetic information written on the magnetic card C in STEP n14 shown in FIG. 7, positions of the respective waveforms W11 to W13 can be specified by reading the respective mark waveforms 111, 112.

Figure 12:
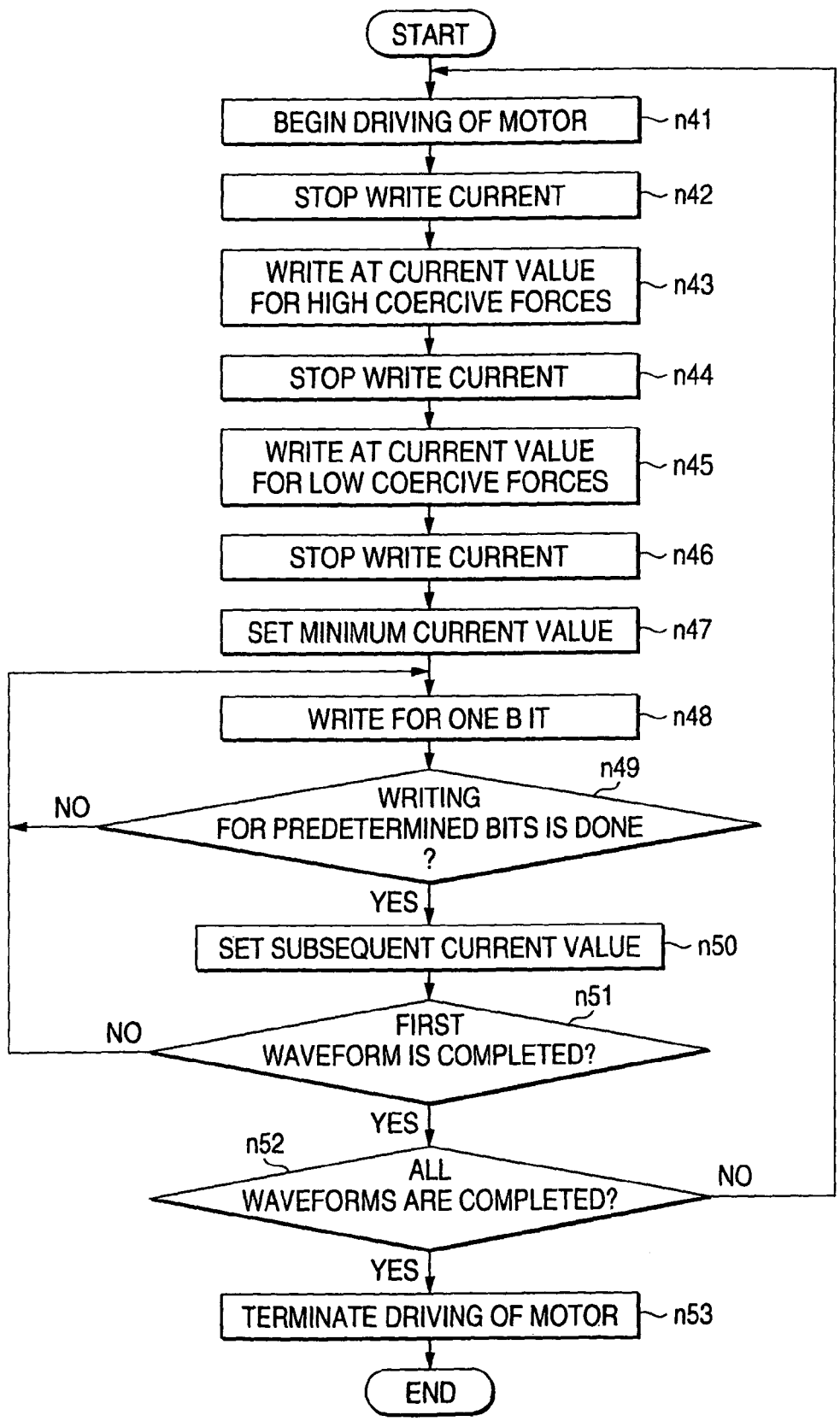
FIG. 12 is a flowchart illustrating a writing operation of waveforms with mark waveforms, according to the second embodiment.

Subsequently, an explanation will be given to an operation of writing processing, in which the waveforms W11 to W13 and the mark waveforms 111, 112 are written, with reference to a flowchart shown in FIG. 12.

In order to perform preliminary writing on the magnetic card C, the CPU 61 first drives the motor M. Thereby, the magnetic card is conveyed at a constant rotating speed (STEP n41).

At this time, when the magnetic card C having been conveyed along the card conveyance path 54 comes into contact with the magnetic head 55, the CPU 61 temporarily stops a write current for the magnetic head 55 via the magnetic writing control unit 63 prior to writing based on the respective waveforms W11 to W13 (STEP n42).

Thereafter, when the magnetic card C reaches a position for writing of a mark waveform, writing based on the mark waveform 111 at a current value for high coercive forces is first started. When writing is done for a traveling quantity, which is based on the mark waveform 111, writing of the mark waveform 111 at the current value for high coercive forces is terminated (STEP n43).

Subsequently, a write current is stopped for a traveling quantity, which presents a distinction from the mark waveform 112 at a current value for low coercive forces (STEP n44).

Thereafter, when the magnetic card C reaches a position for writing of the mark waveform 112 at a current value for low coercive forces, writing of the mark waveform 112 at a current value for low coercive forces is started (STEP n45).

When writing is done for a traveling quantity, which is based on the mark waveform 112, writing of the mark waveform 112 at the current value for low coercive forces is terminated. In this manner, information is written at current values for the respective mark waveforms 111, 112 (STEP n46).

After a write current is stopped, a predetermined duration elapses. Thereafter, when a minimum current value is set, the procedure proceeds to writing of information at a current value based on the first waveform W11, in which a current value is increased stepwise (STEP n47).

Information is written for one bit at the set minimum current value (STEP n48).

It is determined whether information for predetermined bits has been written (STEP n49). When it is determined that information for predetermined bits has not been written, information for one bit is written again (STEP n48). When it is determined that information for predetermined bits has been written, a subsequent current value is set for writing with a current value increased stepwise (STEP n50). It is determined whether writing for the first waveform has been completed (STEP n51). When writing for the first waveform has not been completed, information for one bit is again written (STEP n48).

Until the first waveform W11 (see FIG. 11) is obtained, an operation of preliminary writing, in which a current value every one bit is increased according to the waveform, is repeatedly executed stepwise (STEP n51).

Thereafter, when it is determined that writing based on the first waveform W11 has been completed (STEP n51), the procedure proceeds to writing based on a subsequent waveform. In this case, writing based on the mark waveforms 111, 112 in STEP n42 to STEP n46 is initially performed. Thereafter, the procedure proceeds again to the processes (STEP n47 to STEP n52) for formation of the second waveform W12 (see FIG. 11) to write information on the basis of the second waveform W12. After writing of information based on the second waveform W12, the same processing is repeated to write information on the basis of the third waveform W13 (see FIG. 11) (STEP n42 to STEP n52).

When such writing is terminated, a write current value is stopped and rotation of the motor M is also stopped to stop conveyance of the magnetic card C, thus terminating preliminary writing (STEP n53).

In this manner, to the magnetic head 55 are supplied current values based on all the waveforms 111, 112 and W11 to W13 to write information. Information is written on the basis of all the three waveforms W11 to W13 while the magnetic card C is conveyed from the starting end of the card conveyance path 54 in the vicinity of the insertion port to the terminating end inside in one direction.

Figure 13:
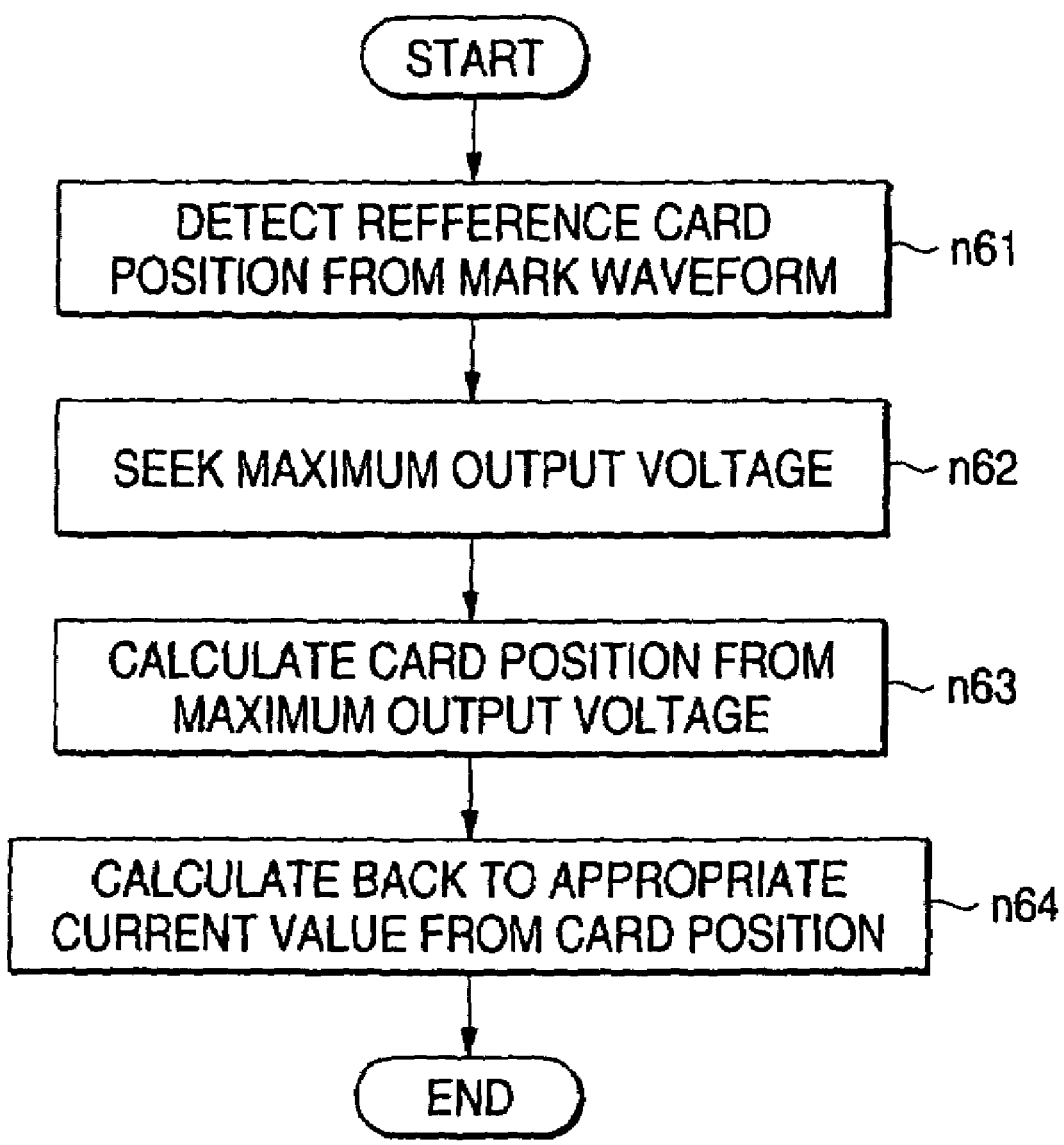
FIG. 13 is a flowchart for finding an appropriate write current value from a mark waveform, according to the second embodiment.

Subsequently, an explanation will be given for an operation to detect an appropriate write current value on the basis of the results of preliminary writing, with reference to a flowchart shown in FIG. 13.

Magnetic card C, for which preliminary writing has been terminated, is conveyed in the return direction in order to determine suitability of a data having been subjected to preliminary writing. During such conveyance, the magnetic card C comes into contact with the magnetic head 55, so that voltage generated is read on the basis of magnetic information written on the magnetic card C. A voltage value at the time of reading causes reference positions of the magnetic card C to be detected from the mark waveforms 111, 112 written on the magnetic card C (STEP n61).

The CPU 61 seeks a voltage value of maximum output from the read voltage value (STEP n62).

A distance from the detected reference position to a position in which the maximum output voltage is obtained (STEP n63).

A current value of information having been written at the time of preliminary writing is found in the found card position corresponding to magnetic information. An appropriate current value for regular writing on the magnetic card C is found (STEP n64).

In this case, since the mark waveforms 111, 112 serve as references for positioning the respective waveforms W11 to W13, it is possible to correctly find positions in the magnetic card C, in which magnetic information is recorded.

Figure 14:
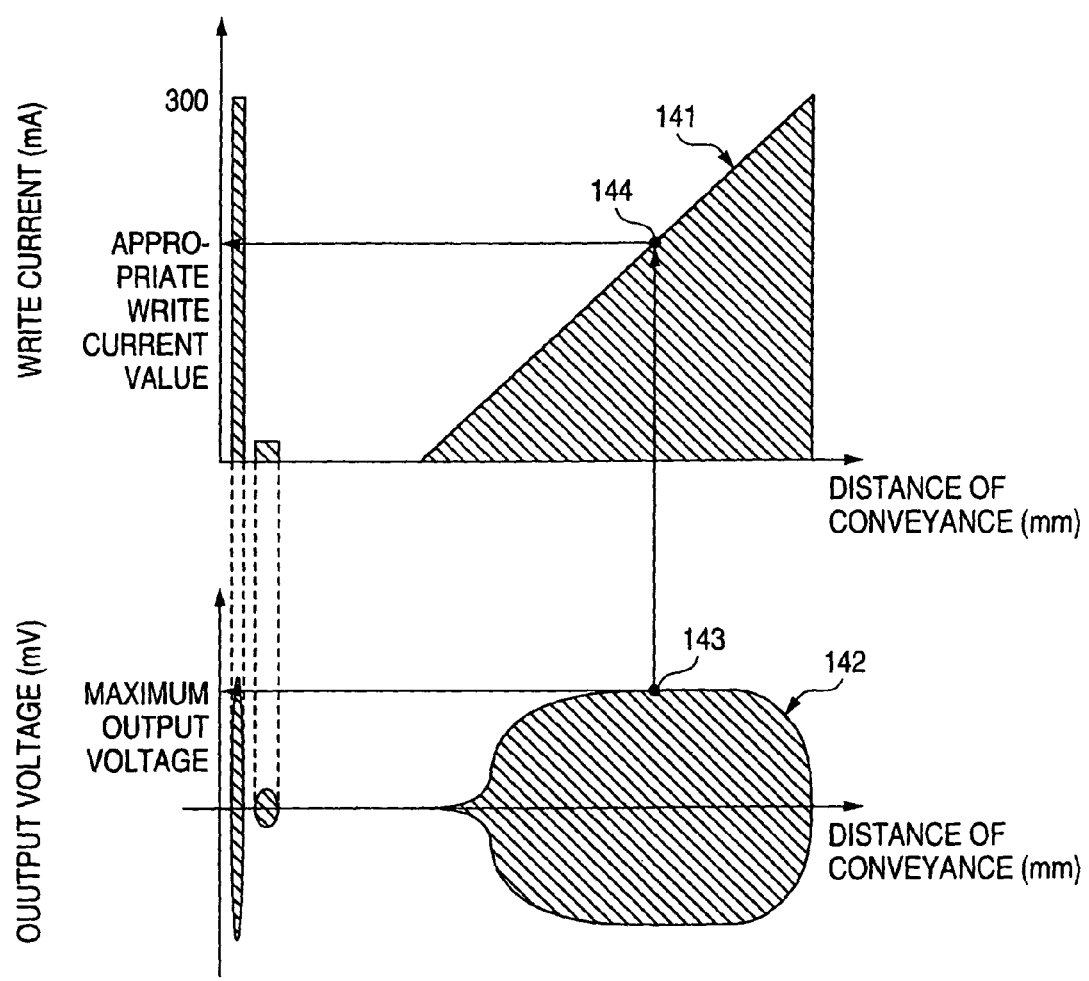
FIG. 14 is a waveform view, in which an appropriate write current value is found for a high coercive force magnetic card, according to the second embodiment.

FIG. 14 shows an example of a write current value for a high coercive force magnetic card and results of reading thereof. In the figure, one among three waveforms is shown in enlarged scale.

A waveform data shown in an upper portion of the figure indicates a waveform 141 of a current value, which is applied when the CPU 61 causes the magnetic head 55 to perform writing according to a program stored in the memory 62, and which varies relative to a distance of conveyance: The relationship between a write current (mA) and a distance of conveyance (mm) is represented in a waveform figure. A waveform data shown in a lower portion of the figure indicates a waveform 142 of a voltage value obtained at the time of reading with the magnetic head 55, the voltage value varying relative to a distance of conveyance. The relationship between an output voltage (mV) and a distance of conveyance (mm) is represented in a waveform figure.

An appropriate write current value for a high coercive force magnetic card is found from these waveforms 141, 142, which vary relative to a distance of conveyance. First, a write current value is caused to vary from a minimum current value to a maximum current value with time, and a waveform 141 of a current value, which is applied at the time of preliminary writing and varies relative to a distance of conveyance, is stored in the memory 62.

Thereafter, a maximum voltage value of a waveform 142 of a voltage, which is read by the magnetic head 55 and varies relative to a distance of conveyance, is detected. Subsequently, a waveform peak position 143 corresponding to the detected maximum voltage value is found. A write current value 144 intersecting the waveform peak position 143 and a card write position of the waveform 141 varying corresponding to an upper-side distance of conveyance stored in the memory 62 makes an appropriate write current value for the high coercive force magnetic card.

Figure 15:
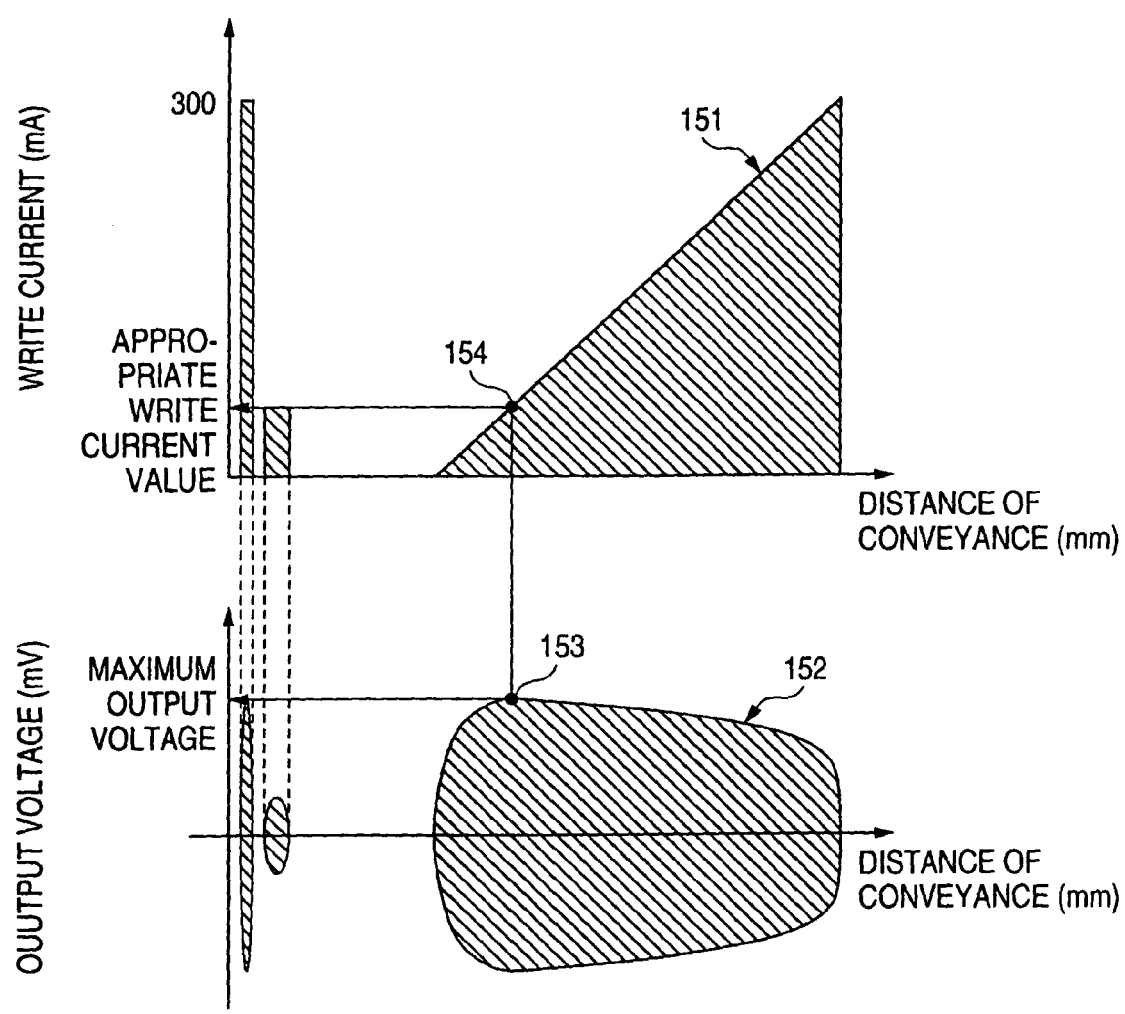
FIG. 15 is a waveform view, in which an appropriate write current value is found for a low coercive force magnetic card, according to the second embodiment.

FIG. 15 shows an example of a write current value for a low coercive force magnetic card and results of reading thereof. In the figure, one among three waveforms is shown in enlarged scale.

In this case, a waveform data shown in an upper portion of the figure indicates also a waveform 151 of a current value, which is applied when the CPU 61 causes the magnetic head 55 to perform writing according to the program stored in the memory 62, and which time-varies relative to a distance of conveyance, and the relationship between a write current (mA) and a distance of conveyance (mm) is represented in a waveform figure. A waveform data shown in a lower portion of the figure indicates a waveform 152 of a voltage value obtained at the time of reading with the magnetic head 55, the voltage value varying relative to a distance of conveyance, and the relationship between an output voltage (mV) and a distance of conveyance (mm) is represented in a waveform figure.

An appropriate write current value for a high coercive force magnetic card is found from these waveforms 151, 152, which vary relative to a distance of conveyance. First, a write current value is caused to vary from a minimum current value to a maximum current value with time, and a waveform 151 of a current value, which is applied at the time of preliminary writing and varies relative to a distance of conveyance, is stored in the memory 62.

Thereafter, a maximum voltage value of a waveform 152 of a voltage, which is read by the magnetic head 55 and varies relative to a distance of conveyance, is detected. Subsequently, a waveform peak position 153 corresponding to the detected maximum voltage value is found. A write current value 154 intersecting the waveform peak position 153 and a card write position of the waveform 151 varying corresponding to an upper-side distance of conveyance stored in the memory 62 makes an appropriate write current value for the low coercive force magnetic card.

Accordingly, also in the case of a high coercive force magnetic card and even in the case of a low coercive force magnetic card, a write current value suited to a coercive force possessed by a concerned magnetic card can be found. Therefore, it is possible to perform writing suited to a coercive force possessed by each magnetic card. In particular, in the case of high coercive force magnetic cards, coercive forces of the cards are different in many cases. Also for high coercive force magnetic cards having different coercive forces, it is possible to find an appropriate write current value for every magnetic card.

Figure 16:
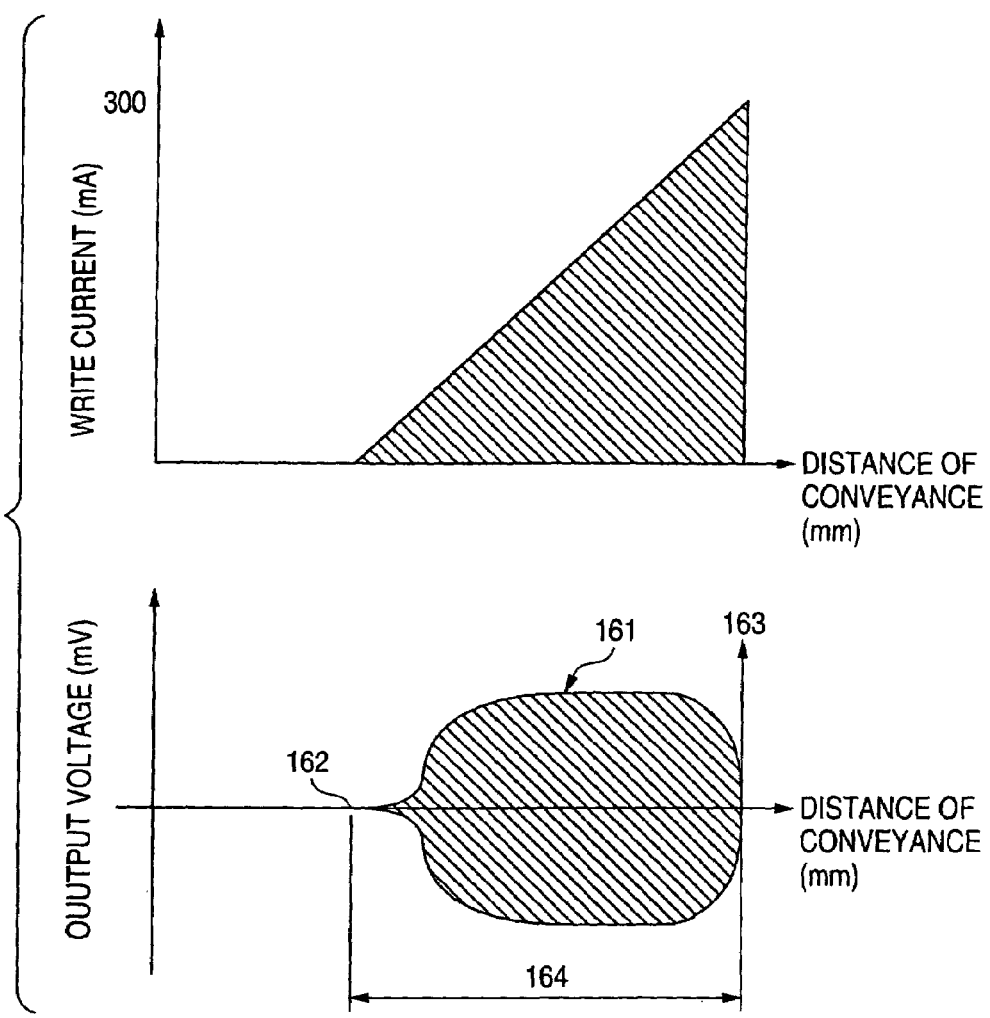
FIG. 16 is a waveform view showing a reference position of a waveform of a high coercive force magnetic card, according to the second embodiment.
Figure 17:
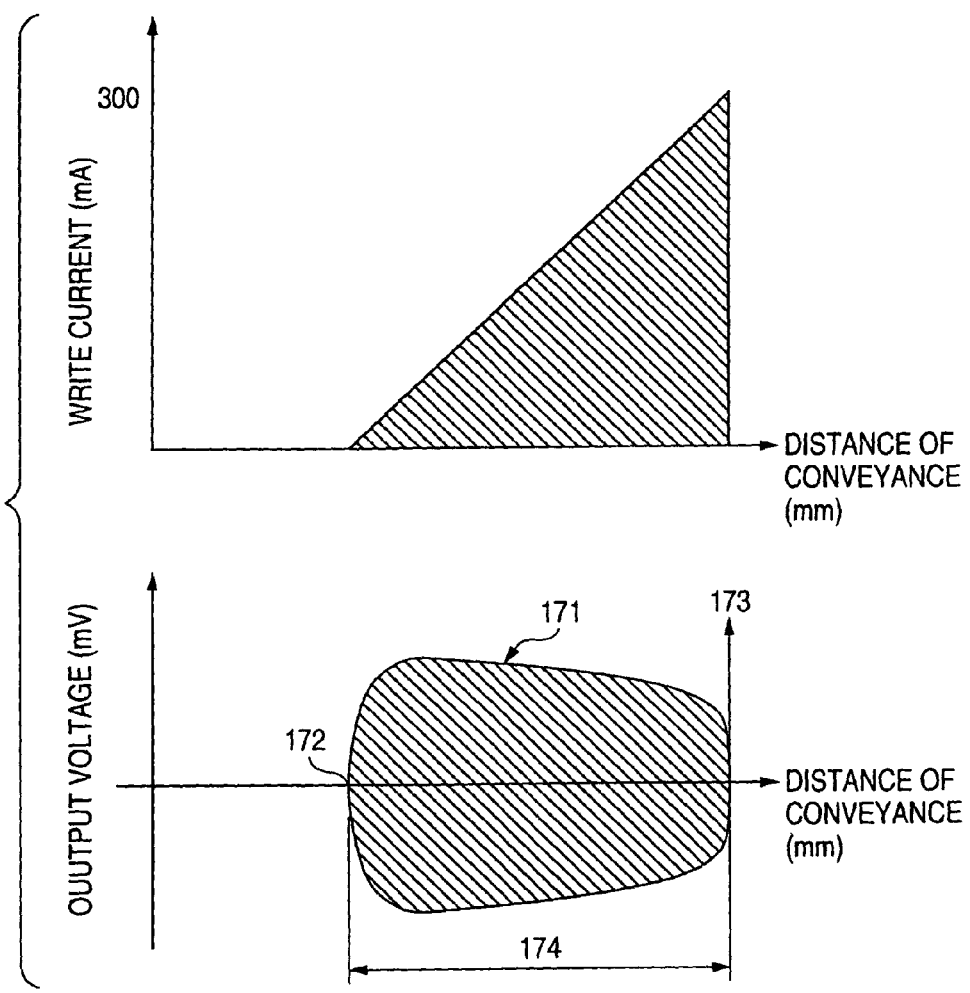
FIG. 17 is a waveform view showing a reference position of a waveform of a low coercive force magnetic card, according to the second embodiment.

Further, as shown in FIGS. 16 and 17, waveforms 161, 171 of a voltage shown in lower portions of the figures and varying corresponding to a distance of conveyance are ambiguous and hard to detect since writing beginning positions 162, 172 therefore gently rise. In contrast, writing terminating positions 163, 173 of the waveforms 161, 171 have high voltage values and clear and easy to detect.

Therefore, the writing terminating positions 163, 173, at which write current values are clearly represented at both ends of reading regions 164, 174, in which waveforms extending from the writing beginning positions 162, 172 to the writing terminating positions 163, 173 are read for every waveform by the magnetic head 55, are made reference positions of waveforms. On the basis of the reference positions, the CPU 61 can determine a traveling quantity of the magnetic card C at the time of reading by the magnetic head 55.

In this manner, the waveforms 161, 171 themselves can have writing reference positions even in the case where a waveform being written does not have any vague writing beginning position or a mark waveform.

Figure 18:
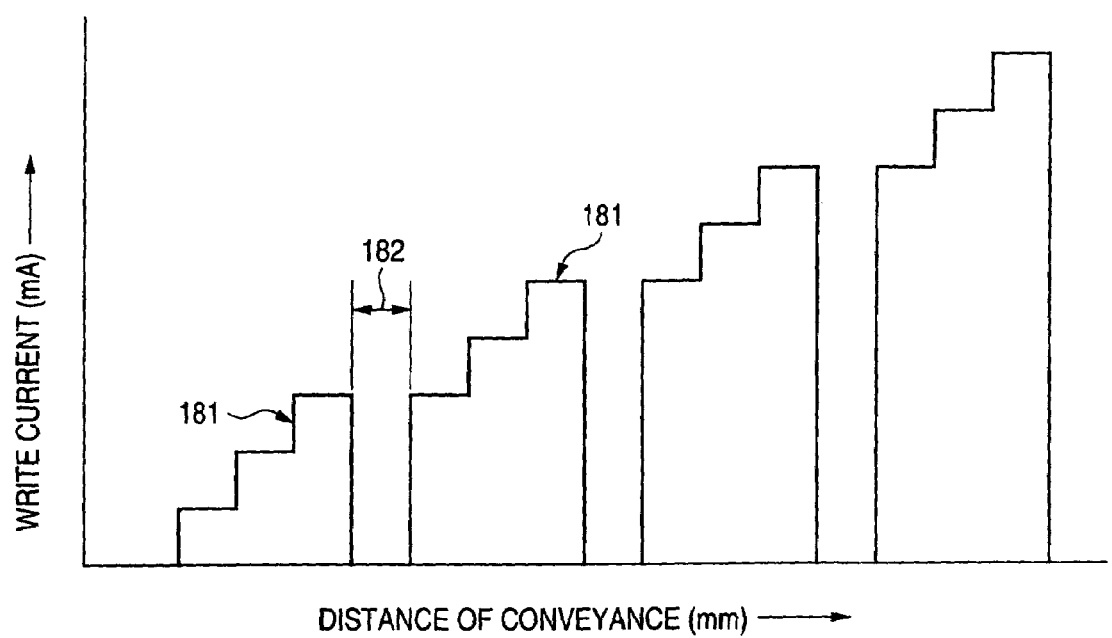
FIG. 18 is a waveform view showing intermittent waveforms and intermittent writing stoppage portions according to the second embodiment.

FIG. 18 shows an example of a waveform varying relative to a distance of conveyance in a further embodiment in which a waveform itself has a reference position. An intermittent waveform 181 is formed as a configuration of a waveform varying relative to a distance of conveyance. In the intermittent waveform 181, the magnetic head 55 performs writing while a current value is increased stepwise, and the write current is repeatedly output and stopped alternately at short intervals.

In such writing, a current is applied to the magnetic head 55 at short intervals on the basis of the intermittent waveform 181, so that information is written. An intermittent writing stoppage portion 182 is formed subsequent to the rising intermittent waveform 181, and a current is applied to the magnetic head 55 on the basis of the intermittent waveform 181, so that information is written. Therefore, the intermittent writing stoppage portion 182 makes a reference position of a waveform itself. In particular, since a current is applied at intervals of short conveyance time on the basis of the intermittent waveform 181 and the intermittent writing stoppage portion 182, a distinction can be made even if the intermittent waveform 181 is partially lost.

Figure 19:
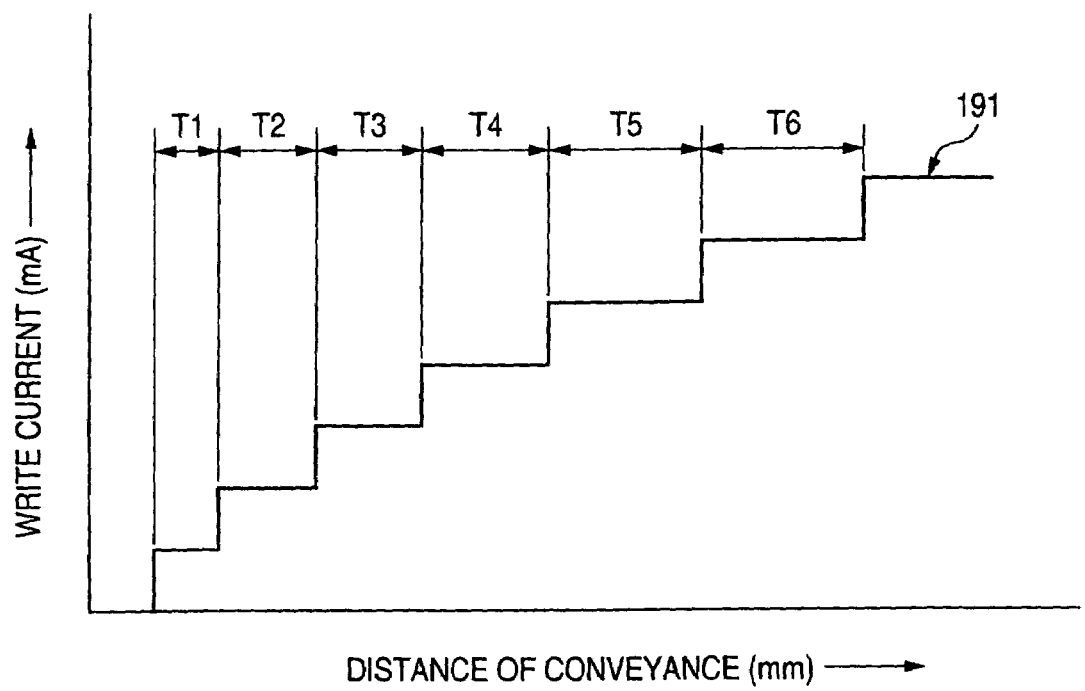
FIG. 19 is a waveform view showing an irregular, stepwise waveform according to the second embodiment.

FIG. 19 shows an example of a waveform varying relative to a distance of conveyance in a further embodiment in which a waveform itself has a reference position. An irregular stepwise waveform 191 is formed as a configuration of a waveform varying relative to a distance of conveyance. The irregular stepwise waveform 191 is written such that when the magnetic head 55 performs writing while increasing a current value stepwise, holding durations T1 to T6 are varied in a manner to be gradually lengthened each time a write current is increased stepwise in output.

In such writing, since holding durations are differed with every stepwise increased write current value, written waveform themselves, which are stepwise written with time differences, in which the holding durations are different, are different one by one. Each of different, irregular stepwise waveforms 191 makes a reference position. Even when being output in such manner, the waveform itself can have a reference position.

In addition, while the waveforms shown in FIGS. 14 to 17 are represented as stepwise waveforms in the same manner as those shown in FIGS. 8 and 11, they are clearly represented by straight lines and curves because such representation is apt to become ambiguous.

The invention is not limited to the configurations of the above embodiments but many embodiments can be obtained.

For example, while in the above embodiments the magnetic processing is executed as the magnetic card C is moved to positions of the stationary heads 35, 36, 55, the invention is not limited thereto but the magnetic processing can be executed as a write head, readout head, or a single magnetic head serving a double purpose of writing and reading is moved past a position of a stationary magnetic card.

The invention claimed is:

1. A device for determining a coercive force of a magnetic recording medium, comprising:
   conveyance means for conveying the magnetic recording medium;
   traveling quantity detection means for detecting a traveling quantity of the magnetic recording medium;
   a write head for writing magnetic information on the magnetic recording medium at a plurality of different current values while the conveyance means conveys the magnetic recording medium in one direction;
   a readout head for reading magnetic information on the magnetic recording medium conveyed by the conveyance means after the write head writes magnetic information on the magnetic recording medium; and
   determination means for determining a coercive force of the magnetic recording medium on the basis of a voltage read by the readout head and a traveling quantity of the magnetic recording medium at the time of reading.

2. A device for determining a coercive force of a magnetic recording medium, comprising:
   conveyance means for conveying the magnetic recording medium;
   traveling quantity detection means for detecting a traveling quantity of the magnetic recording medium;
   a write head for writing magnetic information on the magnetic recording medium conveyed by the conveyance means;
   write current waveform storage means for storing a waveform of a write current value of the write head varying relative to a traveling quantity;
   write current changing means for changing a write current of the write head in accordance with a write current value stored in the write current waveform storage means;
   a readout head for reading magnetic information on the magnetic recording medium conveyed by the conveyance means after the write head writes magnetic information on the magnetic recording medium; and
   determination means for determining a coercive force of the magnetic recording medium on the basis of a voltage read by the readout head, a traveling quantity of the magnetic recording medium at the time of reading, and time-variation of a write current value stored in the write current waveform storage means,
   wherein the write current changing means repeatedly changes the same waveform a plurality of times.

3. The device for determining a coercive force of a magnetic recording medium, according to claim 2, wherein during repetition of the same waveform, the write head does not perform writing by time-space for separation of a plurality of same waveforms.

4. The device for determining a coercive force of a magnetic recording medium, according to claim 2, wherein during repetition of the same waveform, the write current changing means maintains a write current of the write head at a magnitude of a further waveform, which constitutes a reference position, for a duration during which the waveform constituting the reference position is formed.

5. The device for determining a coercive force of a magnetic recording medium, according to claim 2, wherein the write current changing means causes a write current of the write head to be alternately output and stopped repeatedly at predetermined intervals.

6. The device for determining a coercive force of a magnetic recording medium, according to claim 2, wherein the write current changing means stepwise increases a write current such that each time the write current is increased, a duration, during which the write current is maintained, is varied.

7. A device for determining a coercive force of a magnetic recording medium, comprising:
   a write head for writing information on the magnetic recording medium;
   a readout head for reading magnetic information of the magnetic recording medium;
   conveyance means for conveying the write head and the readout head;
   traveling quantity detection means for detecting traveling quantities of the write head and the readout head;
   write current changing means for changing a write current of the write head while the conveyance means conveys the write head in one direction;

reading control means for causing the conveyance means to convey the readout head after the write head writes magnetic information on the magnetic recording medium, and for causing the readout head to read magnetic information on the magnetic recording medium after the write head writes magnetic information on the magnetic recording medium; and determination means for determining a coercive force of the magnetic recording medium on the basis of a value, which the reading control means uses the readout head to read, and a traveling quantity of the readout head at the time of reading.

8. A device for determining a coercive force of a magnetic recording medium, comprising:

conveyance means for conveying the magnetic recording medium relative to a write head and a readout head;

traveling quantity detection means for detecting a traveling quantity caused by the conveyance means;

write current changing means for changing a write current of the magnetic head while the conveyance means moves the magnetic recording medium relative to the write head in one direction; and determination means for causing the readout head to read magnetic information of the magnetic recording medium, which is moved relative to the write head, after the write head writes magnetic information on the magnetic recording medium, and determining a coercive force of the magnetic recording medium on the basis of a voltage read by the readout head and a quantity of movement at the time of reading.

9. The device for determining a coercive force of a magnetic recording medium, according to claim 8, wherein;

the readout head reads magnetic information of the magnetic recording medium beforehand, and comprises magnetic information storage means for storing magnetic information of the magnetic recording medium read beforehand; and after determination by the determination means, the write head writes the magnetic information, stored in the magnetic information storage means, on the magnetic recording medium at a current corresponding to a coercive force determined by the determination means.

10. A device for determining a coercive force of a magnetic recording medium, comprising:

conveyance means for conveying the magnetic recording medium relative to a write head and a readout head;

traveling quantity detection means for detecting a traveling quantity caused by the conveyance means;

write current changing means for changing a write current of the magnetic head while the conveyance means moves the magnetic recording medium relative to the write head in one direction;

write position detection means for detecting a position, in which the write head performs writing on the magnetic recording medium; and determination means for causing the readout head to read magnetic information of the magnetic recording medium, which is moved relative to the readout head, after the write head writes magnetic information on the magnetic recording medium, and determining a coercive force of the magnetic recording medium on the basis of a voltage read by the readout head, a quantity of movement at the time of reading, and the position, in which writing is performed.

* * * * *